United States Patent
Hjärn et al.

(10) Patent No.: US 11,054,532 B2
(45) Date of Patent: Jul. 6, 2021

(54) X-RAY DETECTOR SYSTEM DESIGN

(71) Applicants: Prismatic Sensors AB, Stockholm (SE); General Electric Company, Schenectady, NY (US)

(72) Inventors: Torbjörn Hjärn, Vaxholm (SE); Brian David Yanoff, Niskayuna, NY (US); Brian Breuer, Waukesha, WI (US); Brian Joseph Graves, Waukesha, WI (US); Cheng Xu, Täby (SE); Biju Jacob, Niskayuna, NY (US); Peter Michael Edic, Niskayuna, NY (US); Gregory Scott Zeman, Waukesha, WI (US)

(73) Assignees: PRISMATIC SENSORS AB, Stockholm (SE); GENERAL ELECTRIC COMPANY, Schenectady, NY (US)

( * ) Notice: Subject to any disclaimer, the term of this patent is extended or adjusted under 35 U.S.C. 154(b) by 74 days.

(21) Appl. No.: 16/279,328

(22) Filed: Feb. 19, 2019

(65) Prior Publication Data
US 2019/0383955 A1    Dec. 19, 2019

Related U.S. Application Data

(60) Provisional application No. 62/684,402, filed on Jun. 13, 2018.

(51) Int. Cl.
*G01T 1/24* (2006.01)

(52) U.S. Cl.
CPC .............. *G01T 1/243* (2013.01); *G01T 1/247* (2013.01)

(58) Field of Classification Search
CPC ................................. G01T 1/243; G01T 1/247
USPC ........................................................ 250/370
See application file for complete search history.

(56) References Cited

U.S. PATENT DOCUMENTS

| | | |
|---|---|---|
| 4,937,453 A | 6/1990 | Nelson |
| 5,434,417 A | 7/1995 | Nygren |
| 5,889,313 A | 3/1999 | Parker |
| 6,118,840 A | 9/2000 | Toth et al. |
| 6,167,110 A * | 12/2000 | Possin ..................... G01T 1/201 |
| | | 250/370.11 |
| 6,583,420 B1 * | 6/2003 | Nelson ................. A61B 6/4233 |
| | | 250/363.05 |

(Continued)

OTHER PUBLICATIONS

Danielsson et al., "Dose-Efficient System for Digital Mammography," Proc. SPIE, Physics of Medical Imaging, vol. 3977, pp. 239-249 San Diego, 2000.

(Continued)

*Primary Examiner* — Mark R Gaworecki
(74) *Attorney, Agent, or Firm* — Nixon & Vanderhye

(57) ABSTRACT

There is provided an x-ray detector having a number of x-ray detector sub-modules. Each detector sub-module is an edge-on detector sub-module having an array of detector elements extending in at least two directions, wherein one of the directions has a component in the direction of incoming x-rays. The detector sub-modules are stacked one after the other and/or arranged side-by-side. For at least part of the detector sub-modules, the detector sub-modules are arranged for providing a gap between adjacent detector sub-modules, where at least part of the gap is not directed linearly towards the x-ray focal point of an x-ray source.

32 Claims, 38 Drawing Sheets

(56) References Cited

U.S. PATENT DOCUMENTS

| | | | |
|---|---|---|---|
| 8,183,535 B2 | 5/2012 | Danielsson et al. | |
| 2003/0209672 A1* | 11/2003 | Nelson | A61B 6/4233 |
| | | | 250/505.1 |
| 2004/0008810 A1* | 1/2004 | Nelson | A61B 6/4233 |
| | | | 378/19 |
| 2004/0251419 A1* | 12/2004 | Nelson | G01T 1/243 |
| | | | 250/370.09 |
| 2006/0185165 A1 | 8/2006 | Vafi et al. | |
| 2006/0227930 A1* | 10/2006 | Mattson | A61B 6/032 |
| | | | 378/19 |
| 2007/0019784 A1 | 1/2007 | Ting | |
| 2010/0090116 A1* | 4/2010 | Nelson | G01T 1/2002 |
| | | | 250/367 |
| 2010/0090117 A1* | 4/2010 | Nelson | G01T 1/2002 |
| | | | 250/367 |
| 2010/0096555 A1* | 4/2010 | Nelson | G01T 1/2002 |
| | | | 250/363.04 |
| 2010/0150305 A1 | 6/2010 | Nowak et al. | |
| 2010/0204942 A1* | 8/2010 | Danielsson | G01T 1/242 |
| | | | 702/85 |
| 2012/0033785 A1* | 2/2012 | Michel | G01N 23/20075 |
| | | | 378/21 |
| 2012/0193548 A1 | 8/2012 | Marcovici et al. | |
| 2014/0110592 A1* | 4/2014 | Nelson | G01T 1/1611 |
| | | | 250/370.09 |
| 2015/0323685 A1* | 11/2015 | Nelson | G01T 1/1614 |
| | | | 250/370.08 |
| 2017/0016999 A9* | 1/2017 | Nelson | G01T 1/1611 |
| 2017/0090046 A1* | 3/2017 | Danielsson | G01T 1/242 |
| 2018/0136340 A1* | 5/2018 | Nelson | A61B 6/4241 |
| 2018/0136344 A1* | 5/2018 | Nelson | A61B 6/4233 |
| 2018/0172848 A1* | 6/2018 | Nelson | A61B 6/4208 |
| 2018/0172849 A1* | 6/2018 | Nelson | G01N 23/2255 |

OTHER PUBLICATIONS

Koenig et al., "Charge Summing in Spectroscopic X-Ray Detectors with High-Z Sensors", IEEE Transactions on Nuclear Science 60 (6), pp. 4713-4718, 2013.

Nowotny, "Application of Si-Microstrip-Detectors in Medicine and Structural Analysis" Nuclear Instruments and Methods in Physics Research 226 (1984) 34-39.

Yoshida et al., "Application of silicon strip detectors to X-ray computed tomography" Nuclear Instruments and Methods in Physics Research A 541 (2005) 412-420.

International Search Report, dated Apr. 23, 2019, from corresponding PCT Application No. PCT/SE2019/050149.

International Preliminary Report on Patentability (Chapter II of the Patent Cooperation Treaty), dated Mar. 10, 2020, from corresponding PCT Application No. PCT/SE2019/050149.

* cited by examiner

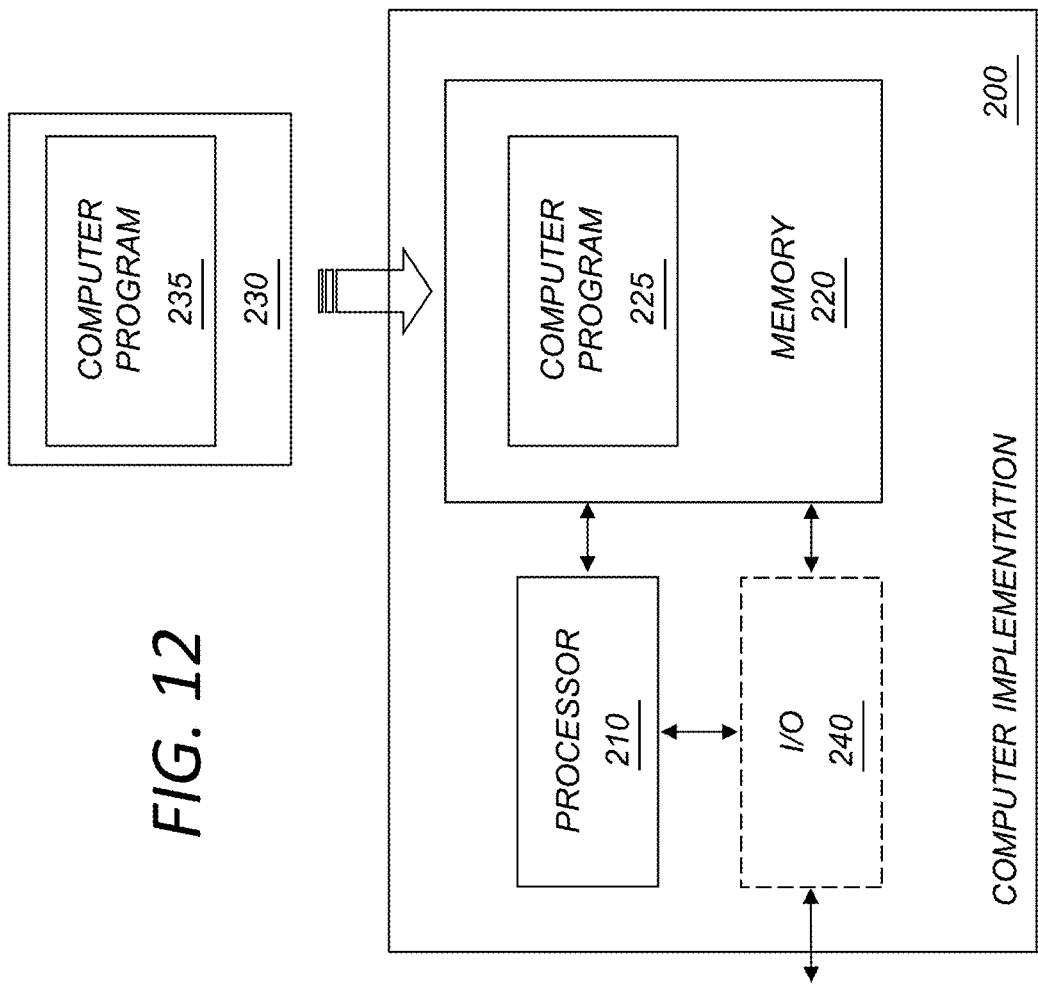

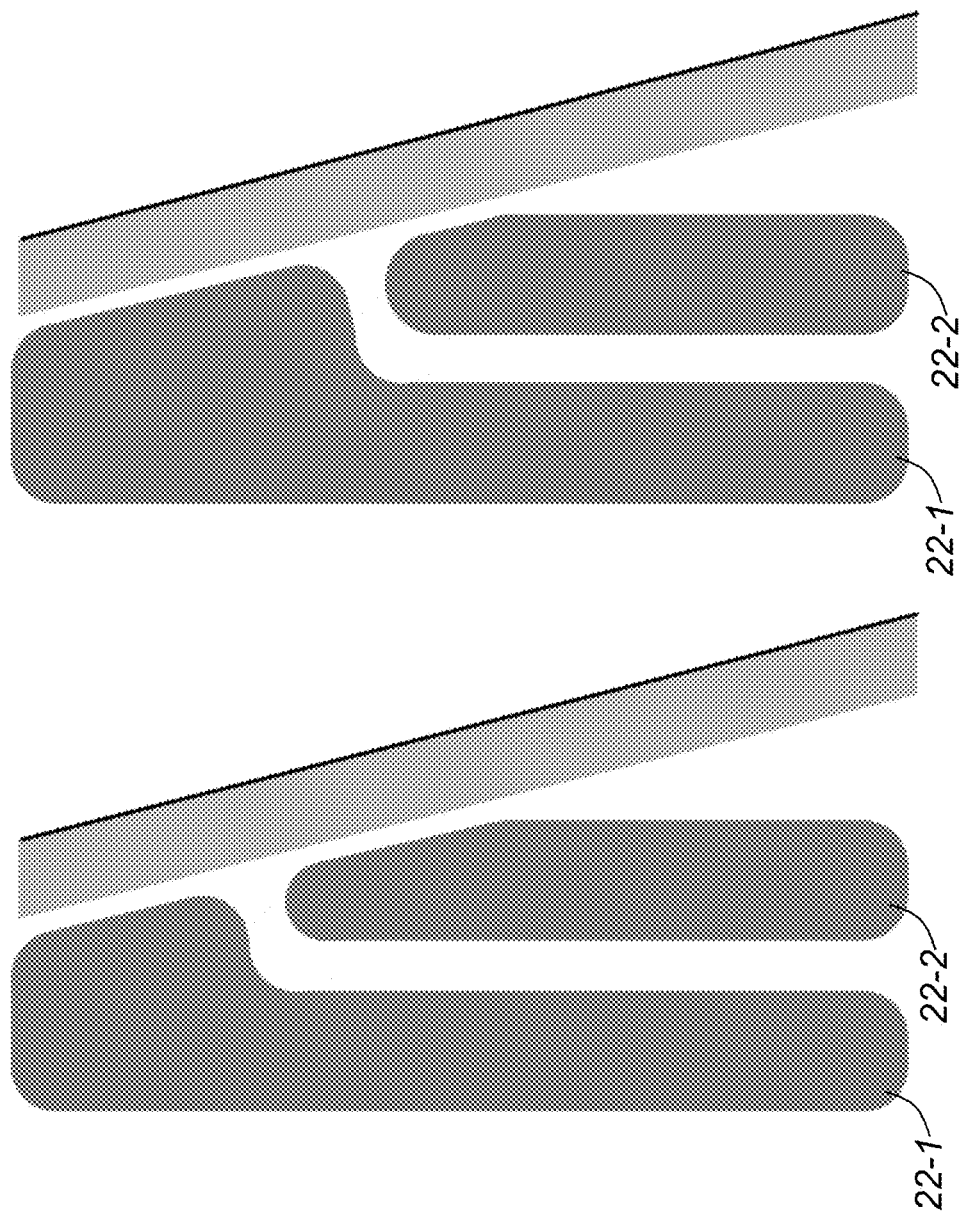

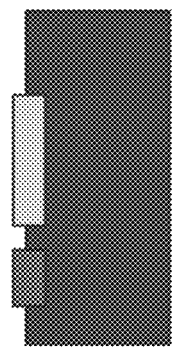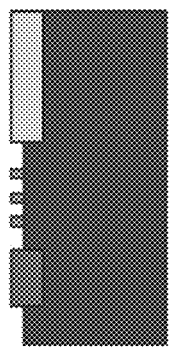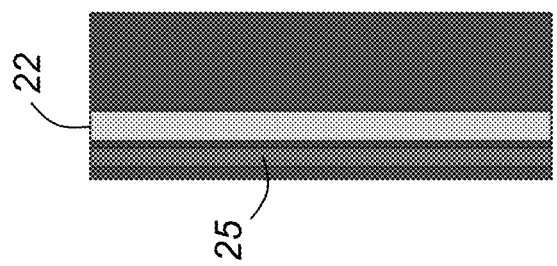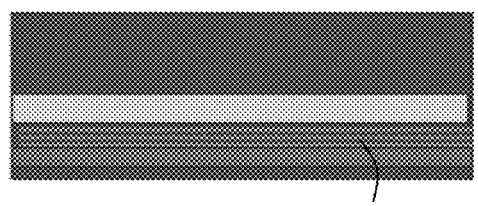
FIG. 31A
FIG. 31B

X-RAY DETECTOR SYSTEM DESIGN

TECHNICAL FIELD

The proposed technology relates to x-ray imaging and x-ray detectors as well as corresponding x-ray imaging systems.

BACKGROUND

Radiographic imaging such as x-ray imaging has been used for years in medical applications and for non-destructive testing.

Normally, an x-ray imaging system includes an x-ray source and an x-ray detector. The x-ray source emits x-rays, which pass through a subject or object to be imaged and are then registered by the x-ray detector. Since some materials absorb a larger fraction of the x-rays than others, an image is formed of the subject or object.

There is a general need for improved x-ray detector designs, and for improved image quality and/or reduced radiation doses.

SUMMARY

It is an object to provide an improved x-ray detector system, simply referred to as an x-ray detector.

Another object is to provide an improved x-ray imaging system.

These objects are met by embodiments of the invention.

The present invention basically relates to an x-ray detector or x-ray sensor having a number of x-ray detector sub-modules, wherein each detector sub-module is an edge-on detector sub-module having an array of detector elements extending in at least two directions, wherein one of the directions has a component in the direction of the x-rays.

In general, the detector sub-modules can be stacked one after the other and/or arranged side-by-side.

For at least part of the detector sub-modules, the detector sub-modules may be arranged for providing a gap between adjacent detector sub-modules, where at least part of the gap is not directed linearly towards the x-ray focal point of an x-ray source.

In this way, it is possible to ensure that the detection efficiency is not zero at any point in the crossover region between adjacent detector sub-modules. This novel design provides detection coverage by at least one of the detector sub-modules at the crossover region between the detector sub-modules.

For example, the detector sub-modules may preferably be arranged side-by-side in a direction substantially perpendicular to the direction of incoming x-rays, and at least part of the gap between adjacent detector sub-modules is out of line with any x-ray path originating from the x-ray focal point to provide detection coverage by at least one of the detector sub-modules at the gap extension between the detector sub-modules.

Optionally, adjacent detector sub-modules may share the information of the same detector element(s) and/or the output signals of different detector elements from adjacent detector modules may be combined.

By way of example, for at least part of the detector sub-modules, adjacent detector sub-modules may have detection areas that are at least partially overlapping in the direction of incoming x-rays.

Optionally, for at least part of the detector sub-modules, detector sub-modules may be arranged for allowing an x-ray that passes through two adjacent detector sub-modules in the gap area to be detected by detector elements in both detector sub-modules.

For example, the output signals of detector elements of two adjacent detector modules originating from an x-ray may be combined during subsequent signal processing for photon counting.

As an example, at least one detector element located closest to the gap, i.e. edge element(s), of a first detector sub-module may be situated in line with, in the direction towards the focal point, at least one detector element not located closest to the gap, i.e. not edge element(s), of a second detector sub-module.

The detector sub-modules may generally be arranged side-by-side, e.g. in a slightly curved overall configuration.

A particular example of an edge-on detector is a depth-segmented x-ray detector, having two or more depth segments of detector elements in the direction of the incoming x-rays. It should, however be understood that the proposed technology is generally applicable to all types of edge-on detectors, including segmented and non-segmented x-ray detectors.

Each detector sub-module is normally based on a substrate in which the detector elements are arranged, and each detector sub-module has an outer guard ring structure that surrounds the array or matrix of detector elements along the sides of the detector sub-module. Sometimes an x-ray detector sub-module is simply referred to as an x-ray sensor.

The inventors have recognized that a normal situation with a modular edge-on x-ray detector system is that physical gaps (arising from practical considerations in the manufacturing) between adjacent detector sub-modules may create passive or dead areas without detection capabilities (also referred to as non-detecting areas). Also, the guard ring structure contributes to the dead area.

It is thus beneficial to provide an x-ray detector system design that increases the efficient detector area and/or reduces dead areas in the overall detector area.

Reducing such dead areas or at least the effect from having such areas is highly beneficial for improved image quality.

A possible solution is based on constructing the detector sub-modules in such a way that, when detector sub-modules are arranged side-by-side, at least one of the detector sub-modules provide detection coverage at the gap extension (crossover region) between the sub-modules.

As mentioned, in the overall design, detector sub-modules may be constructed and arranged side-by-side such that at least part of the gap between two adjacent detector sub-modules is not directed linearly towards the x-ray source (more specifically the x-ray focal point).

In this way, there is a complete absence of any possible x-ray beam path from the x-ray focal point through the gaps. The design provides a gap between adjacent detector sub-modules with a non-zero angle in relation to such x-ray beam path(s), for at least part of the gap.

In other words, the detector sub-modules are constructed in such a way that when they are arranged side-by-side in an overall configuration virtually all incoming x-rays will pass through at least part of the effective detection area of the overall x-ray detector. Expressed slightly differently, ideally, each incoming x-ray will pass through and be detected by at least part of a detector sub-module.

By way of example, for at least part of the detector sub-modules, the detector sub-modules may be arranged side-by-side in the z-direction of a Computed Tomography (CT) system and/or in a direction perpendicular to the z-direction.

Further, when the detector sub-modules are arranged side-by-side in a direction substantially perpendicular to the z-direction, (additional) detector sub-modules may also be stacked one after the other in the z-direction.

Alternatively, when the detector sub-modules are arranged side-by-side substantially in the z-direction, (additional) detector modules may also be stacked in a direction substantially perpendicular to the z-direction.

More generally, side-by-side implies that adjacent detector sub-modules meet side by side, where "side" corresponds to a side of a sub-module along which part of the overall guard ring structure is extending.

Expressed differently, the x-ray detector sub-modules are typically planar modules, and, for at least part of the detector sub-modules, the detector sub-modules are normally arranged side-by-side in the in-plane direction of the detector sub-modules.

In a sense, as mentioned, the proposed setting may be regarded as a configuration in which, for at least part of the detector sub-modules, the detector sub-modules are arranged for providing a gap between adjacent detector sub-modules, where the gap has a non-zero angle in relation to an x-ray beam path from the x-ray focal point, for at least part of the gap.

By way of example, for at least part of the detector sub-modules, the sides or side edges of the detector sub-modules may be slanted sides or edges (with respect to the direction of the incoming x-rays) or the side edges may have a step-like configuration.

For example, the detector sub-modules may have the geometric form of a trapezoid and/or parallelogram.

In a particularly beneficial example, the x-ray detector is a photon-counting x-ray detector.

In general, it is desirable to arrange the detector elements on the substrate of the detector sub-module such that incoming x-rays have the chance to pass through as many detector elements as possible to provide as much spatial/energy information as possible.

By way of example, the detector elements may be elongated electrodes or diodes with the length extension directed towards the focal point of the x-ray system.

By way of example, the detector sub-modules may be silicon chips with metal strips.

The x-ray detector sub-modules are sometimes referred to as x-ray sensors or x-ray sensor modules.

According to a second aspect, there is provided an x-ray imaging system comprising such an x-ray detector.

According to a third aspect, there is provided an x-ray sensor system having a number of x-ray detector sub-modules, wherein each detector sub-module is an edge-on detector sub-module. The detector sub-modules are arranged side-by-side, and the detector sub-modules are arranged for providing a gap between adjacent detector sub-modules, where at least part of the gap is out of line with any x-ray path originating from the x-ray focal point of an x-ray source to provide detection coverage by at least one of the detector sub-modules at the crossover region between the detector sub-modules.

By way of example, the adjacent detector sub-modules may have detection areas, including one or more detector elements, that are at least partially overlapping in the direction of incoming x-rays.

For example, the detector sub-modules may be edge-on silicon sensors that are shaped and patterned with electrodes for allowing them to overlap slightly when placed adjacent to each other.

Other aspects and/or advantages will be appreciated when reading the following description.

BRIEF DESCRIPTION OF THE DRAWINGS

FIG. 12 is a schematic diagram illustrating an example of a computer-implementation according to an embodiment for performing various functions of the overall x-ray imaging systems such as image processing.

FIGS. 26A-B are schematic diagrams illustrating different examples of electrode modifications in connection with tapered edge segments.

FIG. 31A is a schematic diagram illustrating an example of a cross section of the area between guard ring structure and edge electrode(s) without routing traces.

FIG. 31B is a schematic diagram illustrating an example of a cross section of the area between guard ring structure and edge electrode(s) with routing traces.

DETAILED DESCRIPTION

Figure 1:
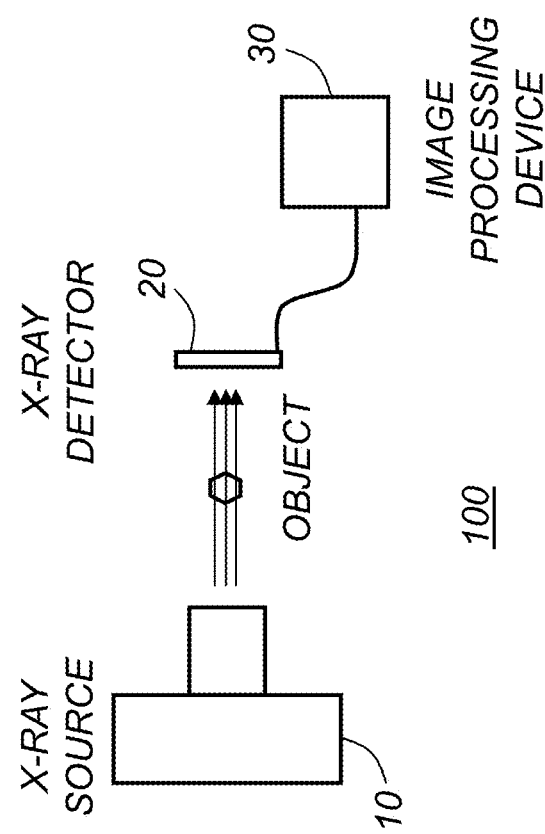
FIG. 1 is a schematic diagram illustrating an example of an overall x-ray imaging system.

It may be useful to begin with a brief overview of an illustrative overall x-ray imaging system, with reference to FIG. 1. In this non-limiting example, the x-ray imaging system 100 basically comprises an x-ray source 10, an x-ray detector 20 and an associated image processing device 30. In general, the x-ray detector 20 is configured for registering radiation from the x-ray source 10 that may have been focused by optional x-ray optics and passed an object or subject or part thereof. The x-ray detector 20 is connectable to the image processing device 30 via suitable analog processing and read-out electronics (which may be integrated in the x-ray detector 20) to enable image processing and/or image reconstruction by the image processing device 30.

Figure 2:
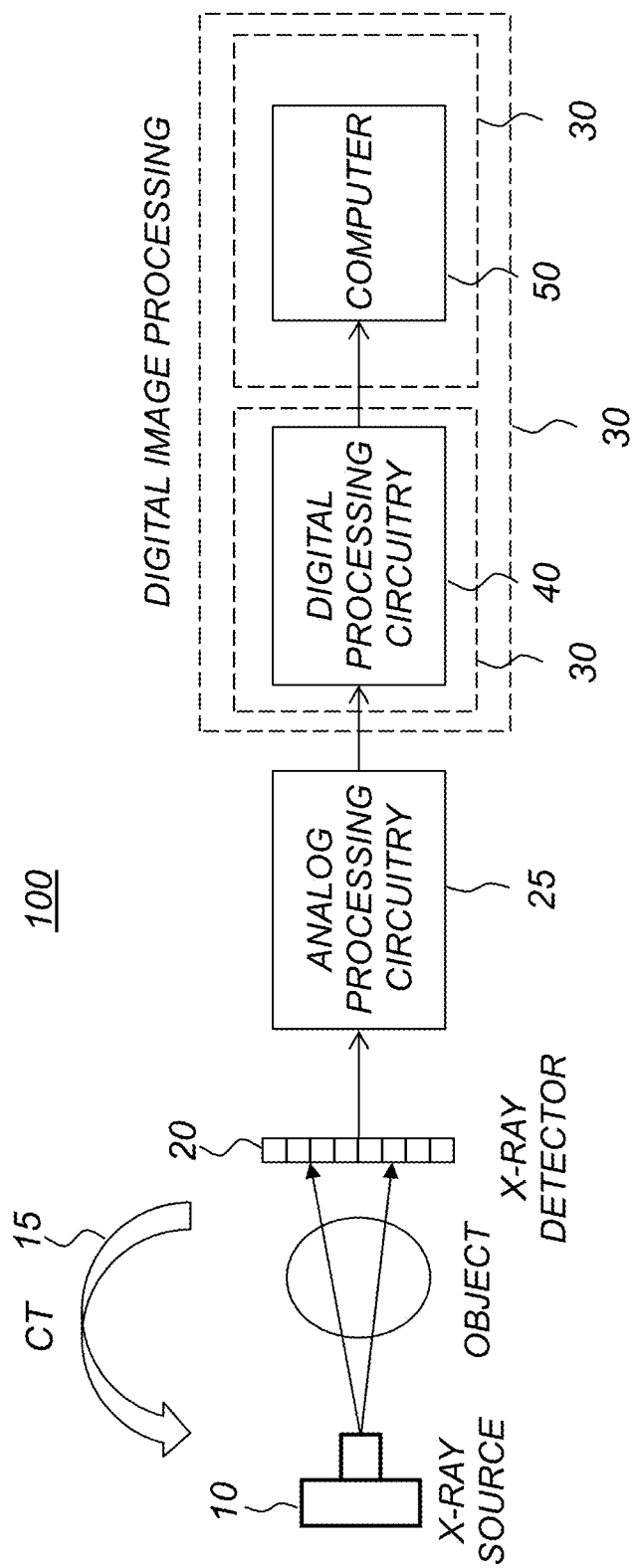
FIG. 2 is a schematic diagram illustrating another example of an x-ray imaging system.

As illustrated in FIG. 2, another example of an x-ray imaging system 100 comprises an x-ray source 10, which emits x-rays; an x-ray detector 20, which detects the x-rays after they have passed through the object; analog processing circuitry 25, which processes the raw electrical signal from the detector and digitizes it; digital processing circuitry 40 which may carry out further processing operations on the measured data such as applying corrections, storing it temporarily, or filtering; and a computer 50 which stores the processed data and may perform further post-processing and/or image reconstruction.

The overall detector may be regarded as the x-ray detector 20, or the x-ray detector 20 combined with the associated analog processing circuitry 25.

The digital part including the digital processing circuitry 40 and/or the computer 50 may be regarded as a digital image processing system 30, which performs image reconstruction based on the image data from the x-ray detector. The image processing system 30 may thus be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is a Computed Tomography (CT) system, which may include an x-ray source that produces a fan or cone beam of x-rays and an opposing x-ray detector for registering the fraction of x-rays that are transmitted through a patient or object. The x-ray source and detector are normally mounted in a gantry that rotates around the imaged object.

Accordingly, the x-ray source 10 and the x-ray detector 20 illustrated in FIG. 2 may thus be arranged as part of a CT system, e.g. mountable in a CT gantry.

A challenge for x-ray imaging detectors is to extract maximum information from the detected x-rays to provide input to an image of an object or subject where the object or subject is depicted in terms of density, composition and structure. It is still common to use film-screen as detector but most commonly the detectors today provide a digital image.

Modern x-ray detectors normally need to convert the incident x-rays into electrons, this typically takes place through photo absorption or through Compton interaction and the resulting electrons are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

Conventional x-ray detectors are energy integrating, the contribution from each detected photon to the detected signal is therefore proportional to its energy, and in conventional CT, measurements are acquired for a single energy distribution. The images produced by a conventional CT system therefore have a certain look, where different tissues and materials show typical values in certain ranges.

There are detectors operating in an integrating mode in the sense that they provide an integrated signal from a multitude of x-rays and the signal is only later digitized to retrieve a best guess of the number of incident x-rays in a pixel.

Photon counting detectors have also emerged as a feasible alternative in some applications; currently those detectors are commercially available mainly in mammography. The photon counting detectors have an advantage since in principle the energy for each x-ray can be measured which yields additional information about the composition of the object. This information can be used to increase the image quality and/or to decrease the radiation dose.

Compared to the energy-integrating systems, photon-counting CT has the following advantages. Firstly, electronic noise that is integrated into the signal by the energy-integrating detectors can be rejected by setting the lowest energy threshold above the noise floor in the photon-counting detectors. Secondly, energy information can be extracted by the detector, which allows improving contrast-to-noise ratio by optimal energy weighting and which also allows so-called material basis decomposition, by which different materials and/or components in the examined subject or object can be identified and quantified, to be implemented effectively. Thirdly, more than two basis materials can be used which benefits decomposition techniques, such as K-edge imaging whereby distribution of contrast agents, e.g. iodine or gadolinium, are quantitatively determined. Fourth, there is no detector afterglow, meaning that high angular resolution can be obtained. Last but not least, higher spatial resolution can be achieved by using smaller pixel size.

The most promising materials for photon-counting x-ray detectors are cadmium telluride (CdTe), cadmium zinc telluride (CZT) and silicon (Si). CdTe and CZT are employed in several photon-counting spectral CT projects for the high absorption efficiency of high-energy x-rays used in clinical CT. However, these projects are slowly progressing due to several drawbacks of CdTe/CZT. CdTe/CZT have low charge carrier mobility, which causes severe pulse pileup at flux rates ten times lower than those encountered in clinical practice. One way to alleviate this problem is to decrease the pixel size, whereas it leads to increased spectrum distortion as a result of charge sharing and K-escape. Also, CdTe/CZT suffer from charge trapping, which would lead to polarization that causes a rapid drop of the output count rate when the photon flux reaches above a certain level.

In contrast, silicon has higher charge carrier mobility and is free from the problem of polarization. The mature manufacturing process and comparably low cost are also its advantages. But silicon has limitations that CdTe/CZT does not have. Silicon sensors must accordingly be quite thick to compensate for its low stopping power. Typically, a silicon sensor needs a thickness of several centimeters to absorb most of the incident photons, whereas CdTe/CZT needs only several millimeters. On the other hand, the long attenuation path of silicon also makes it possible to divide the detector into different depth segments, as will be explained below. This in turn makes it possible for a silicon-based photon-counting detector to properly handle the high fluxes in CT.

When using simple semiconductor materials, such as silicon or germanium, Compton scattering causes many x-ray photons to convert from a high energy to a low energy before conversion to electron-hole pairs in the detector. This results in a large fraction of the x-ray photons, originally at a higher energy, producing much less electron-hole pairs than expected, which in turn results in a substantial part of the photon flux appearing at the low end of the energy distribution. In order to detect as many of the x-ray photons as possible, it is therefore necessary to detect as low energies as possible.

Figure 3:
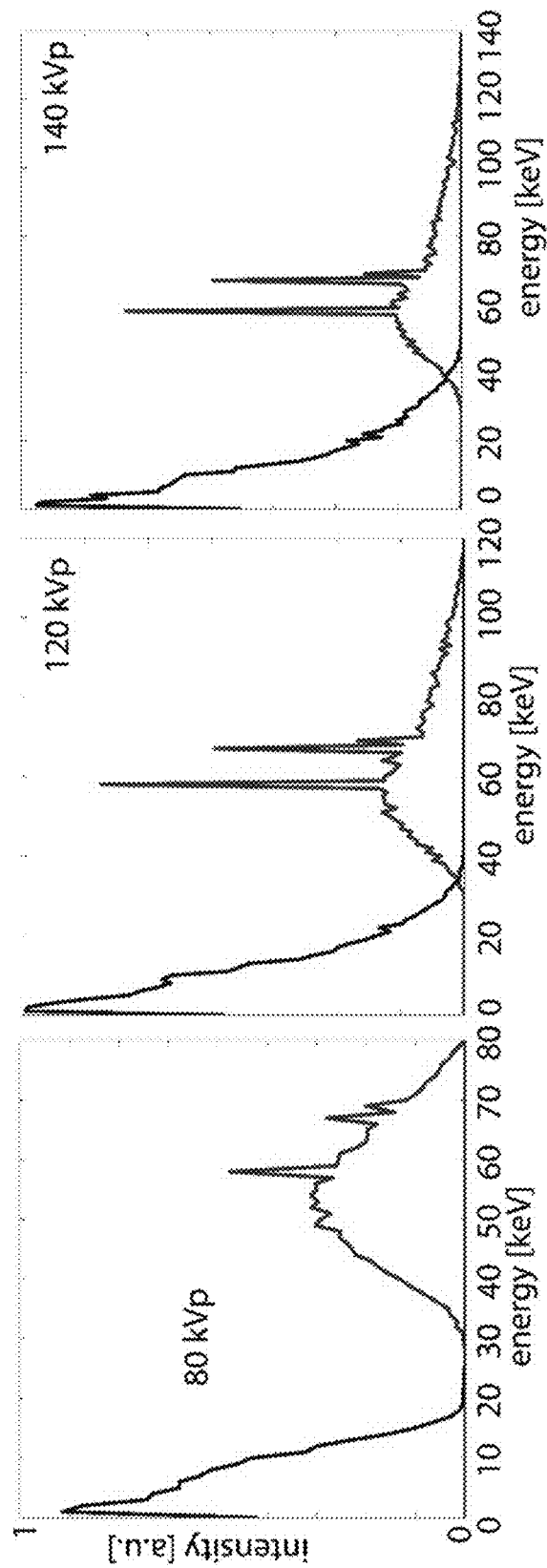
FIG. 3 is a schematic diagram illustrating examples of the detected energy spectrum for three different x-ray tube voltages.

FIG. 3 is a schematic diagram illustrating examples of the energy spectrum for three different x-ray tube voltages. The energy spectrum is built up by deposited energies from a mix of different types of interactions, including Compton events at the lower energy range and photoelectric absorption events at the higher energy range.

A further development of x-ray imaging is energy-resolved x-ray imaging, also known as spectral x-ray imaging, where the x-ray transmission is measured for several different energy levels. This can be achieved by letting the source switch rapidly between two different emission spectra, by using two or more x-ray sources emitting different x-ray spectra, or by using an energy-discriminating detector which measures the incoming radiation in two or more energy levels, also referred to as energy bins.

Figure 4:
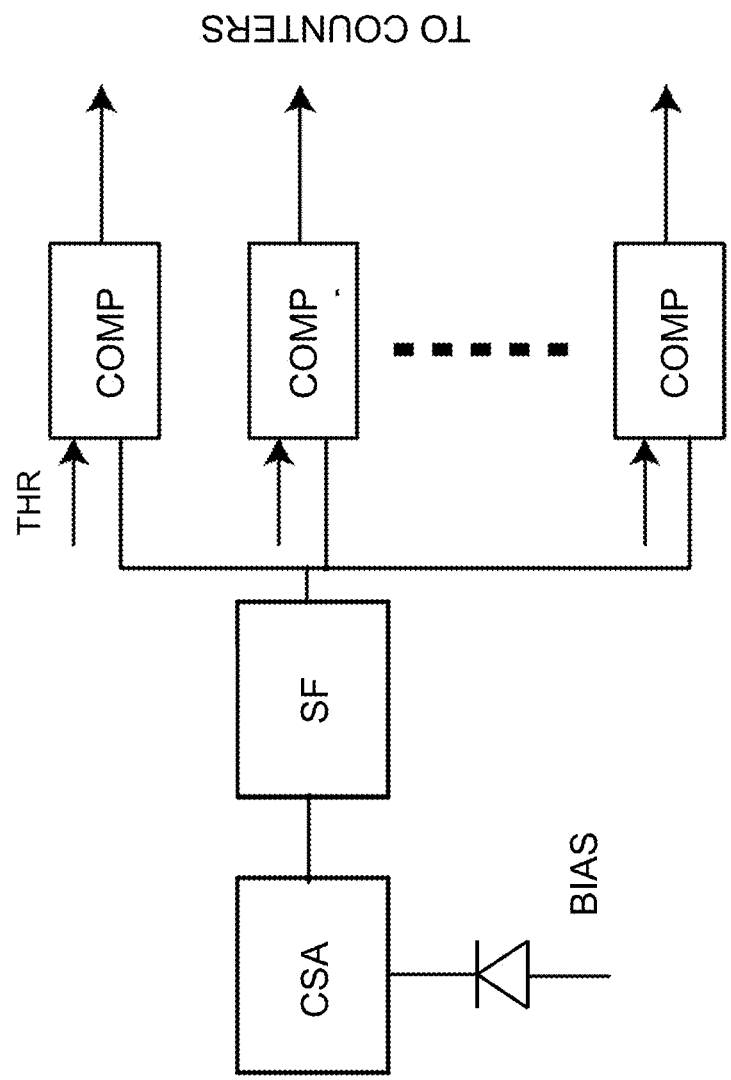
FIG. 4 is a schematic diagram illustrating an example of a photon counting mechanism.

In the following, a brief description of an example of an energy-discriminating photon-counting detector is given with reference to FIG. 4. In this example, each registered photon generates a current pulse which is compared to a set of thresholds, thereby counting the number of photons incident in each of a number of energy bins.

In general, the x-ray photons, including also photons after Compton scattering, are converted to electron-hole pairs inside the semiconductor detector, where the number of electron-hole pairs is generally proportional to the photon energy. The electrons and holes are then drifting towards the detector electrodes, then leaving the detector. During this drift, the electrons and holes induce an electrical current in the electrode, a current which may be measured, e.g. through a Charge Sensitive Amplifier (CSA), followed by a Shaping Filter (SF), as schematically illustrated in FIG. 4.

As the number of electrons and holes from one x-ray event is proportional to the x-ray energy, the total charge in one induced current pulse is proportional to this energy. The current pulse is amplified in the CSA and then filtered by the SF filter. By choosing an appropriate shaping time of the SF filter, the pulse amplitude after filtering is proportional to the total charge in the current pulse, and therefore proportional to the x-ray energy. Following the SF filter, the pulse amplitude is measured by comparing its value with one or several threshold values (Thr) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value (Thr) which has been detected within a certain time frame.

When using several different threshold values, a so-called energy-discriminating detector is obtained, in which the detected photons can be sorted into energy bins corresponding to the various threshold values. Sometimes, this type of detector is also referred to as a multi-bin detector.

In general, the energy information allows for new kinds of images to be created, where new information is available and image artifacts inherent to conventional technology can be removed.

In other words, for an energy-discriminating detector, the pulse heights are compared to a number of programmable thresholds in the comparators and classified according to pulse-height, which in turn is proportional to energy.

However, an inherent problem in any charge sensitive amplifier is that it will add electronic noise to the detected current. In order to avoid detecting noise instead of real x-ray photons, it is therefore important to set the lowest threshold value (Thr) high enough so that the number of times the noise value exceeds the threshold value is low enough not to disturb the detection of x-ray photons.

By setting the lowest threshold above the noise floor, electronic noise, which is the major obstacle in the reduction of radiation dose of the x-ray imaging systems, can be significantly reduced The shaping filter has the general property that large values of the shaping time will lead to a long pulse caused by the x-ray photon and reduce the noise amplitude after the filter. Small values of the shaping time will lead to a short pulse and a larger noise amplitude. Therefore, in order to count as many x-ray photons as possible, a large shaping time is desired to minimize noise and allowing the use of a relatively small threshold level.

Another problem in any counting x-ray photon detector is the so called pile-up problem. When the flux rate of x-ray photons is high there may be problems in distinguishing between two subsequent charge pulses. As mentioned above, the pulse length after the filter depends on the shaping time. If this pulse length is larger than the time between two x-ray photon induced charge pulses, the pulses will grow together and the two photons are not distinguishable and may be counted as one pulse. This is called pile-up. One way to avoid pile-up at high photon flux is to use a small shaping time.

In order to increase the absorption efficiency, the detector can be arranged edge-on, in which case the absorption depth can be chosen to any length and the detector can still be fully depleted without going to very high voltages.

In particular, silicon has many advantages as detector material such as high purity and a low energy required for creation of charge carriers (electron-hole pairs) and a also a high mobility for these charge carriers which means it will work even for high rates of x-rays. Silicon is also readily available in large volumes.

The main challenge with silicon is its low atomic number and low density which means it has to be made very thick for higher energies to be an efficient absorber. The low atomic number also means the fraction of Compton scattered x-ray photons in the detector will dominate over the photo-absorbed photons which will create problem with the scattered photons since they may induce signals in other pixels in the detector which will be equivalent to noise in those pixels. Silicon has however been used successfully in applications with lower energy as is for example outlined by M. Danielsson, H. Bornefalk, B. Cederström, V. Chmill, B. Hasegawa, M. Lundqvist, D. Nygren and T. Taber, "Dose-efficient system for digital mammography", Proc. SPIE, Physics of Medical Imaging, vol. 3977, pp. 239-249 San Diego, 2000. One way to overcome the problem of low absorption efficiency for silicon is to simply make it very thick, the silicon is produced in wafers which are approximately 500 µm thick and these wafers can be oriented so that the x-rays are incident edge-on and the depth of silicon may be as much as the diameter of the wafer if required.

Another method to make silicon deep enough to get high efficiency is advocated in U.S. Pat. No. 5,889,313 of Sherwood Parker, "Three dimensional architecture for solid state radiation detectors", 1999, this is an inventive method but involves some non-standard production methods which may be the reason why it has not been used in commercial imaging detectors.

The first mentioning of crystalline silicon strip detectors in edge-on geometry as an x-ray detector we could find is R. Nowotny, "Application Of Si-Microstrip-Detectors In Medicine And Structural Analysis", Nuclear Instruments and Methods in Physics Research 226 (1984), 34-39. It concludes that silicon will work at low energies such as for breast imaging but not for higher energies such as computed tomography mainly because of the higher fraction of Compton scattering and problems related to this.

The edge-on geometry for semiconductor detectors is also suggested in U.S. Pat. No. 4,937,453 of Robert Nelson, "X-ray detector for radiographic imaging", U.S. Pat. No. 5,434,417 of David Nygren, "High resolution energy-sensitive digital X-ray" and US Patent Application Publication 2004/0251419 of Robert Nelson. In US 2004/0251419, edge-on detectors are used for so called Compton imaging, in which the energy and direction of the Compton scattered x-ray is measured in order to make an estimation of the energy of the original x-ray. The method of Compton imaging has been much discussed in the literature for a long time but mainly applies to energies higher than what is employed in x-ray imaging, such as Positron Emission Tomography. Compton imaging does not relate to the present invention.

In a paper by S Shoichi Yoshida, Takashi Ohsugi, "Application of silicon strip detectors to X-ray computed tomography", Nuclear Instruments and Methods in Physics Research A 541 (2005), 412-420 an implementation of the edge-on concept is outlined. In this implementation thin tungsten plates placed between edge-on silicon strip detector reduces the background of scattered X-rays and improve the image contrast with low dose. The implementation is very similar to what is proposed by R. Nowotny, "Application Of Si-Microstrip-Detectors In Medicine And Structural Analysis", Nuclear Instruments and Methods in Physics Research 226 (1984), 34-39.

Several proposals have been made for photon-counting semiconductor detectors based on high-Z materials such as CdZnTe and clinical images have also been acquired with prototype detectors. The drawback with these materials is the cost and lack of experience in production volumes.

There has been a considerable interest in photon counting detectors in particular for medical imaging but so far there is no working commercial solution at higher energies than around 40 keV. This is because of problems to manufacture detectors in feasible and readily available materials; exotic high Z semiconductors are still expensive and unproven. Silicon has worked for lower energies but for higher energies the problem of high fraction of Compton scatter has been a prohibitive problem together with a working system assembly of a detector that fulfills the geometrical requirements of for example today's CT modalities in terms of combining high detection efficiency in terms of geometry and absorption.

U.S. Pat. No. 8,183,535 discloses an example of a photon-counting edge-on x-ray detector. In this patent, there are multiple semiconductor detector sub-modules arranged together to form an overall detector area, where each semiconductor detector sub-module comprises an x-ray sensor oriented edge-on to incoming x-rays and connected to integrated circuitry for registration of x-rays interacting in the x-ray sensor.

The semiconductor detector sub-modules are normally tiled together to form a full detector of almost arbitrary size with almost perfect geometrical efficiency except for an anti-scatter module which is integrated between at least some of the semiconductor detector sub-modules. Preferably, each anti-scatter module includes a foil of relatively heavy material to prevent most of the Compton scattered x-rays in a semiconductor detector sub-module to reach an adjacent detector sub-module.

Figure 5:
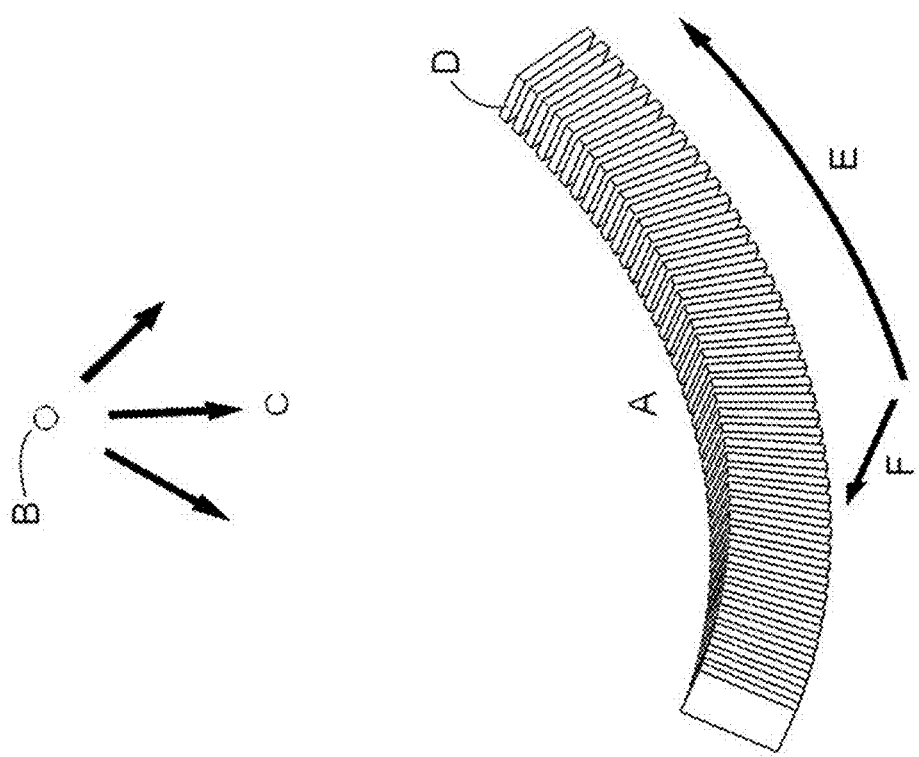
FIG. 5 is a schematic diagram of an X-ray detector according to an exemplary embodiment.

FIG. 5 is a schematic diagram of an X-ray detector according to an exemplary embodiment. In this example there is shown a schematic view of an X-ray detector (A) with x-ray source (B) emitting x-rays (C). The elements of the detector (D) are pointing back to the source, and thus preferably arranged in a slightly curved overall configuration. Two possible scanning motions (E,F) of the detector are indicated. In each scanning motion the source may be stationary or moving, in the scanning motion indicated by (E) the x-ray source and detector may be rotated around an object positioned in between. In the scanning motion indicated with (F) the detector and the source may be translated relative to the object, or the object may be moving. Also in scan motion (E) the object may be translated during the rotation, so called spiral scanning. By way of example, for CT implementations, the x-ray source and detector may be mounted in a gantry that rotates around the object or subject to be imaged.

Figure 6:
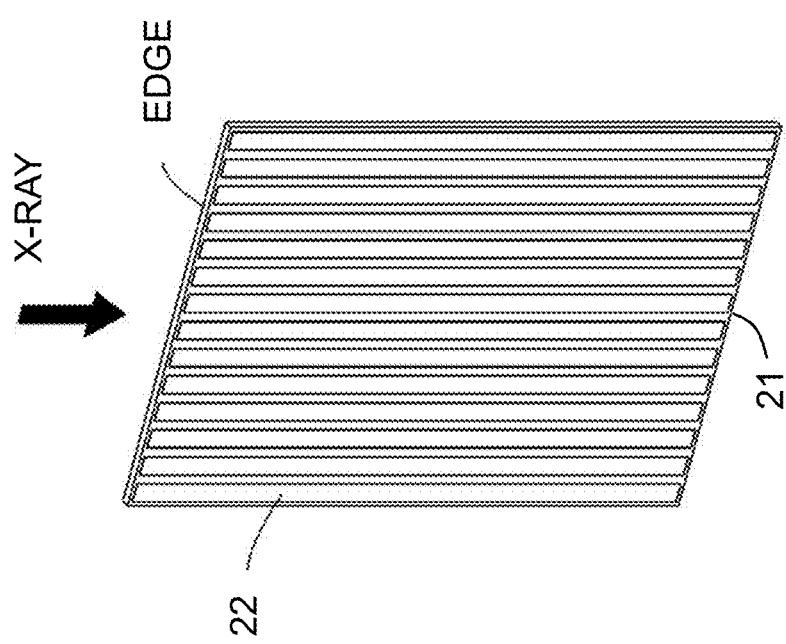
FIG. 6 is a schematic diagram illustrating an example of a semiconductor detector sub-module according to an exemplary embodiment.

FIG. 6 is a schematic diagram illustrating an example of a semiconductor detector sub-module according to an exemplary embodiment. This is an example of a semiconductor detector sub-module with the sensor part 21 split into detector elements or pixels 22, where each detector element (or pixel) is normally based on a diode having a charge collecting electrode as a key component. The x-rays enter through the edge of the semiconductor sensor.

Figure 7:
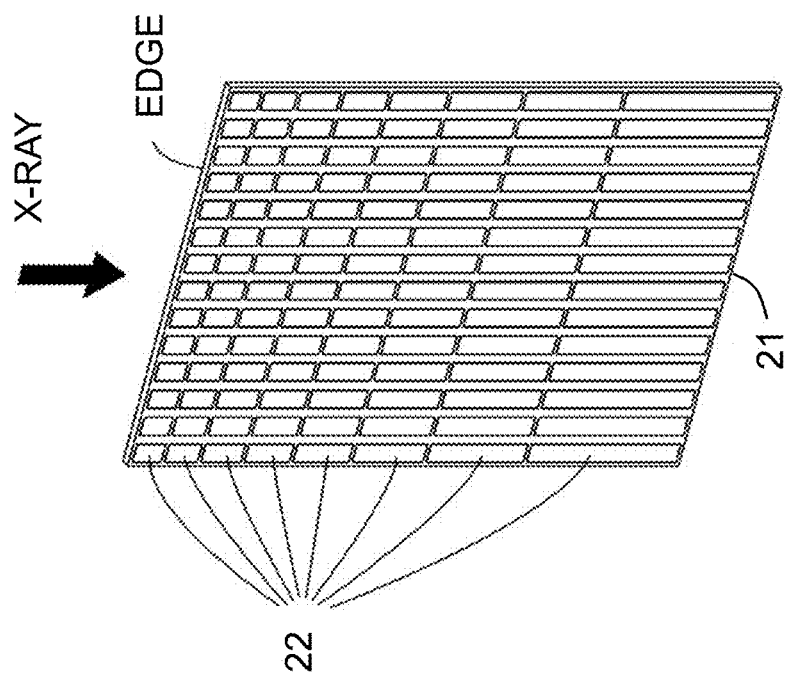
FIG. 7 is a schematic diagram illustrating an example of semiconductor detector sub-module according to another exemplary embodiment.

FIG. 7 is a schematic diagram illustrating an example of semiconductor detector sub-module according to another exemplary embodiment. In this example, the semiconductor sensor part 21 is also split into so-called depth segments 22 in the depth direction, again assuming the x-rays enter through the edge.

Normally, a detector element is an individual x-ray sensitive sub-element of the detector. In general, the photon interaction takes place in a detector element and the thus generated charge is collected by the corresponding electrode of the detector element.

Each detector element typically measures the incident x-ray flux as a sequence of frames. A frame is the measured data during a specified time interval, called frame time.

Depending on the detector topology, a detector element may correspond to a pixel, especially when the detector is a flat-panel detector. A depth-segmented detector may be regarded as having a number of detector strips, each strip having a number of depth segments. For such a depth-segmented detector, each depth segment may be regarded as an individual detector element, especially if each of the depth segments is associated with its own individual charge collecting electrode.

The detector strips of a depth-segmented detector normally correspond to the pixels of an ordinary flat-panel detector, and therefore sometimes also referred to as pixel strips. However, it is also possible to regard a depth-segmented detector as a three-dimensional pixel array, where each pixel (sometimes referred to as a voxel) corresponds to an individual depth segment/detector element.

The semiconductor sensors may be implemented as so called Multi-Chip Modules (MCMs) in the sense that the semiconductor sensors are used as base substrates for electric routing and for a number of Application Specific Integrated Circuits (ASICs) which are attached preferably through so called flip-chip technique. The routing will include a connection for the signal from each pixel or detector element to the ASIC input as well as connections from the ASIC to external memory and/or digital data processing. Power to the ASICs may be provided through similar routing taking into account the increase in cross-section which is required for the large currents in these connections, but the power may also be provided through a separate connection. The ASICS may be positioned on the side of the active sensor and this means it can be protected from the incident x-rays if an absorbing cover is placed on top and it can also be protected from scattered x-rays from the side by positioning an absorber also in this direction.

Figure 8B:
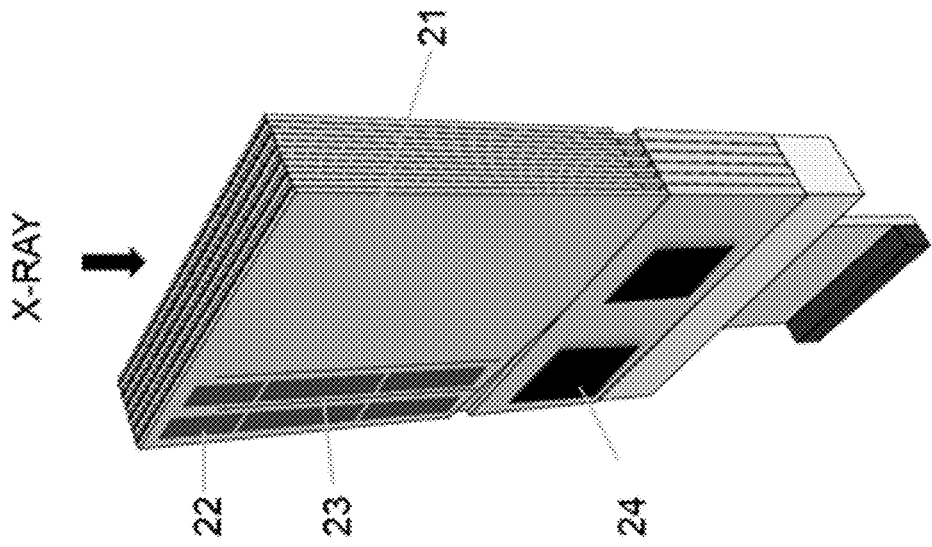
FIG. 8B is a schematic diagram illustrating an example of a set of tiled detector sub-modules, where each detector sub-module is a depth-segmented detector sub-module and the ASICs or corresponding circuitry are arranged below the detector elements as seen from the direction of the incoming x-rays.
Figure 8A:
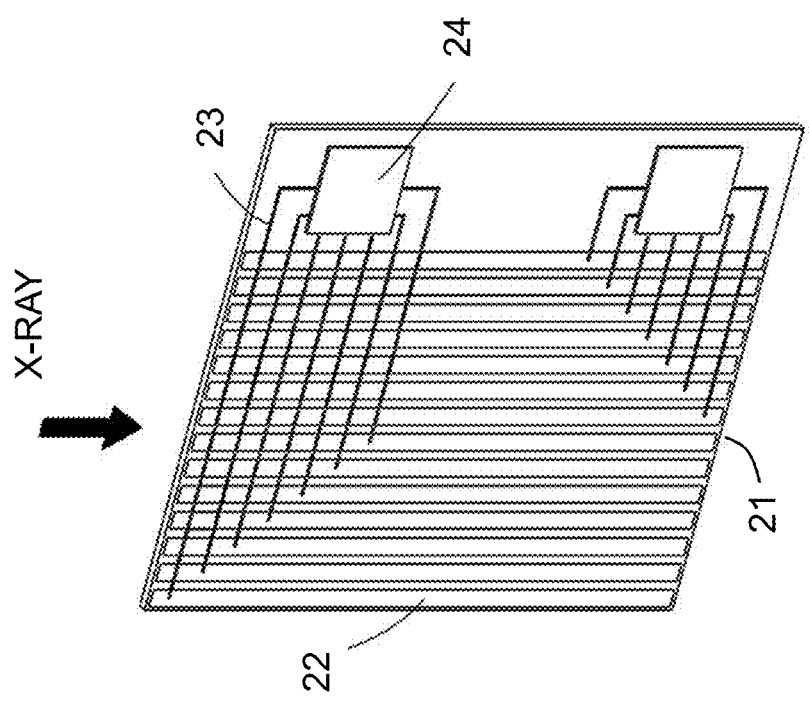
FIG. 8A is a schematic diagram illustrating an example of a semiconductor detector sub-module according to yet another exemplary embodiment.

FIG. 8A is a schematic diagram illustrating a semiconductor detector sub-module implemented as a Multi-Chip Module similar to embodiments in U.S. Pat. No. 8,183,535.

In this example, it is illustrated how the semiconductor sensor 21 also can have the function of substrate in a Multi-Chip Module (MCM). The signal is routed by signal paths 23 from the detector elements or pixels 22 to inputs of parallel processing circuits 24 (e.g. ASICs) that are positioned next to the active sensor area. It should be understood that the term Application Specific Integrated Circuit (ASIC) is to be interpreted broadly as any general integrated circuit used and configured for a specific application. The ASICs process the electric charge generated from each x-ray and convert it to a signal which can be used to detect a photon and/or estimate the energy of the photon. The ASICs may be configured for connection to digital processing circuitry and/or memories located outside of the MCM and finally the data will be used as input for reconstructing an image.

However, the employment of depth segments also brings problem to a silicon-based photon-counting detector. A large number of ASIC channels has to be employed to process data fed from the associated detector segments.

FIG. 8B is a schematic diagram illustrating an example of a set of tiled detector sub-modules, where each detector sub-module is a depth-segmented detector sub-module and the ASICs or corresponding circuitry 24 are arranged below the detector elements 22 as seen from the direction of the incoming x-rays, allowing for routing paths 23 from the detector elements 22 to the ASICs 24 in the space between detector elements.

Figure 9:
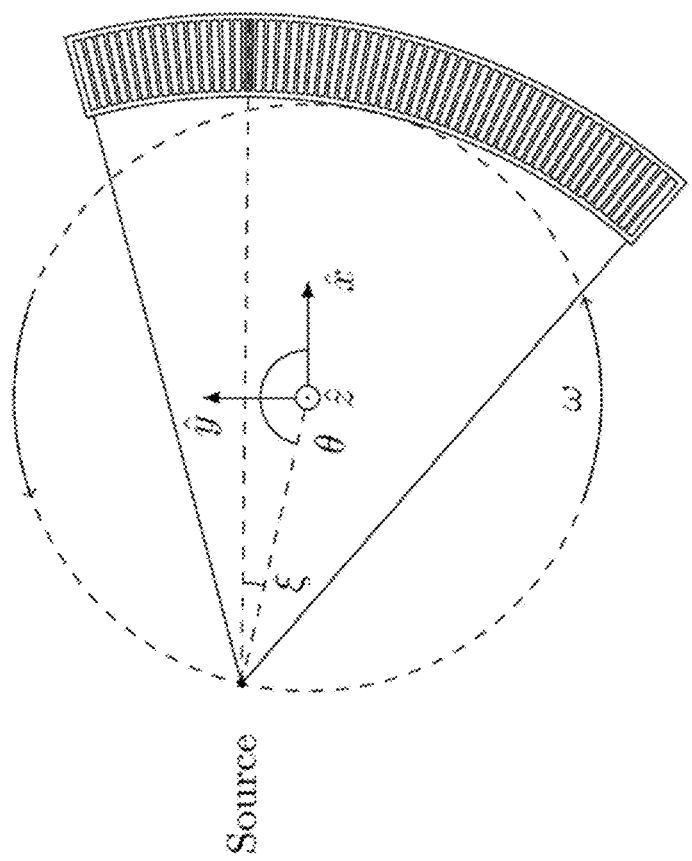
FIG. 9 is a schematic diagram illustrating an example of a Computed Tomography (CT) geometry.

An example of a commonly used x-ray imaging system is an x-ray Computed Tomography (CT) system, which may include an x-ray tube that produces a fan- or cone beam of x-rays and an opposing array of x-ray detectors measuring the fraction of x-rays that are transmitted through a patient or object. The x-ray tube and detector array are mounted in a gantry that rotates around the imaged object. An example illustration of a CT geometry is shown in FIG. 9.

The dimensions and segmentation of the detector array affect the imaging capabilities of the CT apparatus. A plurality of detector elements in the direction of the rotational axis of the gantry, i.e. the z-direction of FIG. 9 enables multi-slice image acquisition. A plurality of detector elements in the angular direction (ξ in FIG. 9) enables measurement of multiple projections in the same plane simultaneously and this is applied in fan/cone-beam CT. Most conventional detectors are two-dimensional (sometimes called flat-panel detectors), meaning that they have detector elements in the slice (z) and angular (ξ) directions.

Figure 10:
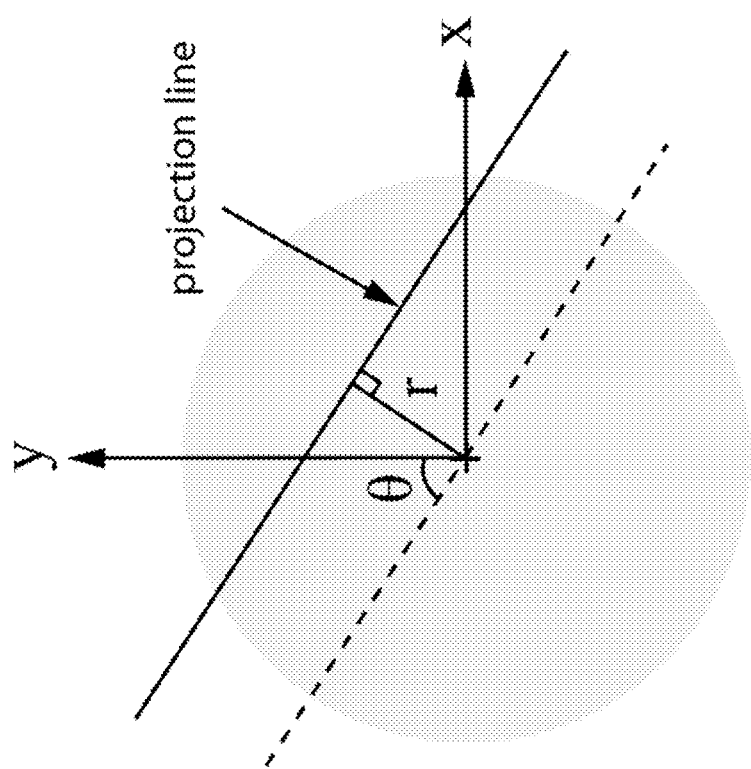
FIG. 10 is a schematic diagram illustrating an example of a definition of a projection line.

For a given rotational position, each detector element measures the transmitted x-rays for a certain projection line. Such a measurement is called a projection measurement. The collection of projection measurements for many projection lines is called a sinogram even if the detector is two-dimensional, making the sinogram a three-dimensional image. The sinogram data is utilized through image reconstruction to obtain an image of the interior of the imaged object. Each projection line (a point in the sinogram) is given by an angular coordinate, θ, and a radial coordinate, r, as defined in FIG. 10. Each measurement with a detector element at a specific coordinate given by (r, θ) is a sample of the sinogram. More samples in the sinogram generally lead to a better representation of the real sinogram and therefore also a more accurately reconstructed image.

Figure 11:
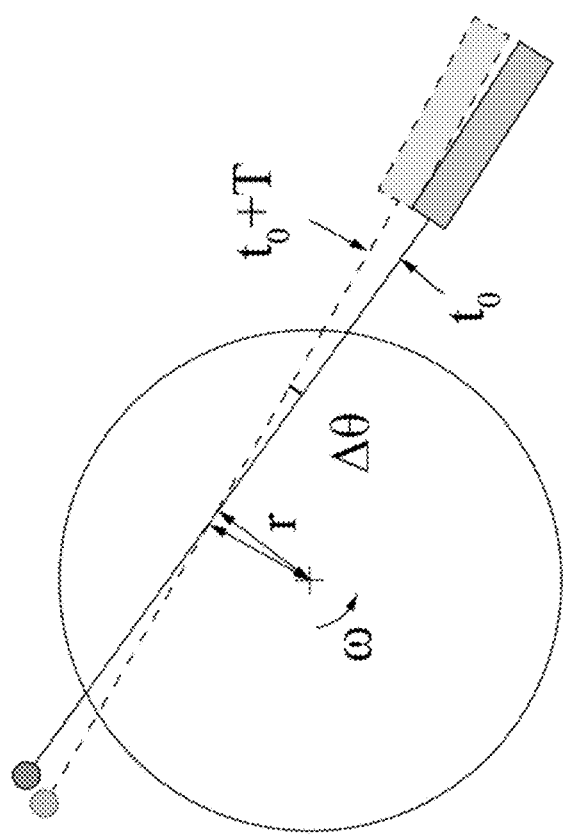
FIG. 11 is a schematic diagram illustrating an example of angular sampling.

FIG. 11 is a schematic diagram illustrating an example of angular sampling.

FIG. 12 is a schematic diagram illustrating an example of a computer implementation according to an embodiment for performing various functions of the overall x-ray imaging systems such as image processing. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output interface 240 that may be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The present invention basically relates to an x-ray detector or x-ray sensor having a number of x-ray detector sub-modules, wherein each detector sub-module is an edge-on detector sub-module having detector elements arranged to enable measuring of x-ray intensity with spatial separation in the direction of the x-rays.

Edge-on is a design for an x-ray detector, where each sub-module has detector elements extending in at least two directions, wherein one of the directions of the edge-on detector has a component in the direction of the x-rays.

A particular example of an edge-on detector is a depth-segmented x-ray detector, having two or more depth segments of detector elements in the direction of the incoming x-rays. It should, however be understood that the proposed technology is generally applicable to all types of edge-on detectors, including segmented and non-segmented x-ray detectors.

Each detector sub-module is normally based on a substrate in which the detector elements are arranged, and each detector sub-module typically has an outer guard ring structure that surrounds the array or matrix of detector elements, and extends along the sides (edges) of the detector sub-module.

The detector sub-modules can be stacked one after the other and/or arranged side-by-side. The detector sub-modules may generally be arranged side-by-side, e.g. in a slightly curved overall configuration, which may be suitable for a CT system.

The inventors have recognized that a normal situation with a modular edge-on x-ray detector is that physical gaps (arising from practical considerations in the manufacturing) between adjacent detector sub-modules may create passive or dead areas without detection capabilities (also referred to as non-detecting areas). Also, the guard ring structure contributes to dead area.

It is thus beneficial to provide an x-ray detector design that increases the efficient detector area and/or reduces dead areas in the overall detector area.

Reducing such dead areas or at least the effect from having such areas is highly beneficial for improved image quality.

A possible solution is based on constructing the detector sub-modules in such a way that, when detector sub-modules are arranged side-by-side, at least one of the detector sub-modules provides detection coverage at the gap extension between the sub-modules.

In the overall design, detector sub-modules may be constructed and arranged side-by-side such that at least part of the gap between two adjacent detector sub-modules is not directed linearly towards the x-ray source (more specifically the x-ray focal point).

In this way, there is a complete absence of any possible x-ray beam path directed from the focal point through the gaps. The design provides a gap between adjacent detector sub-modules with a non-zero angle in relation to such x-ray path(s), for at least part of the gap.

In other words, the detector sub-modules are constructed in such a way that when they are arranged side-by-side in an overall configuration virtually all incoming x-rays will pass through at least part of the effective detection area of the overall x-ray detector. Expressed slightly differently, ideally, each incoming x-ray will pass through and be detected by at least part of a detector sub-module.

By way of example, the detector sub-modules may be arranged side-by-side in the z-direction of a Computed Tomography (CT) system and/or in a direction perpendicular to the z-direction.

More generally, side-by-side implies that adjacent detector sub-modules meet side by side, where "side" corresponds to a side of a sub-module along which part of the overall guard ring structure is extending.

Expressed differently, the x-ray detector sub-modules are typically planar modules, and the detector sub-modules are normally arranged side-by-side in the in-plane direction of the detector sub-modules.

In practice, it is desirable to arrange the detector elements on the substrate of the detector sub-module such that incoming x-rays have the chance to pass through as many detector elements as possible to provide as much spatial/energy information as possible.

In effect, this may imply that with the new design, adjacent detector sub-modules may "share" the information of same detector element(s) and/or that the output signals of different detector elements from adjacent detector modules may be combined.

This enables consolidating full detector/pixel strip data at the module level, before passing the data to the next level of the system. It should though be understood that it may also be important to be able to provide for segment-level data.

By way of example, the detector elements may be elongated electrodes with the length extension directed towards the focal point of the x-ray system.

By way of example, the detector sub-modules may be silicon chips with metal strips.

According to a second aspect there is provided an x-ray imaging system, e.g. similar to that of FIG. 1 or FIG. 2, comprising such an x-ray detector.

Figure 13A:
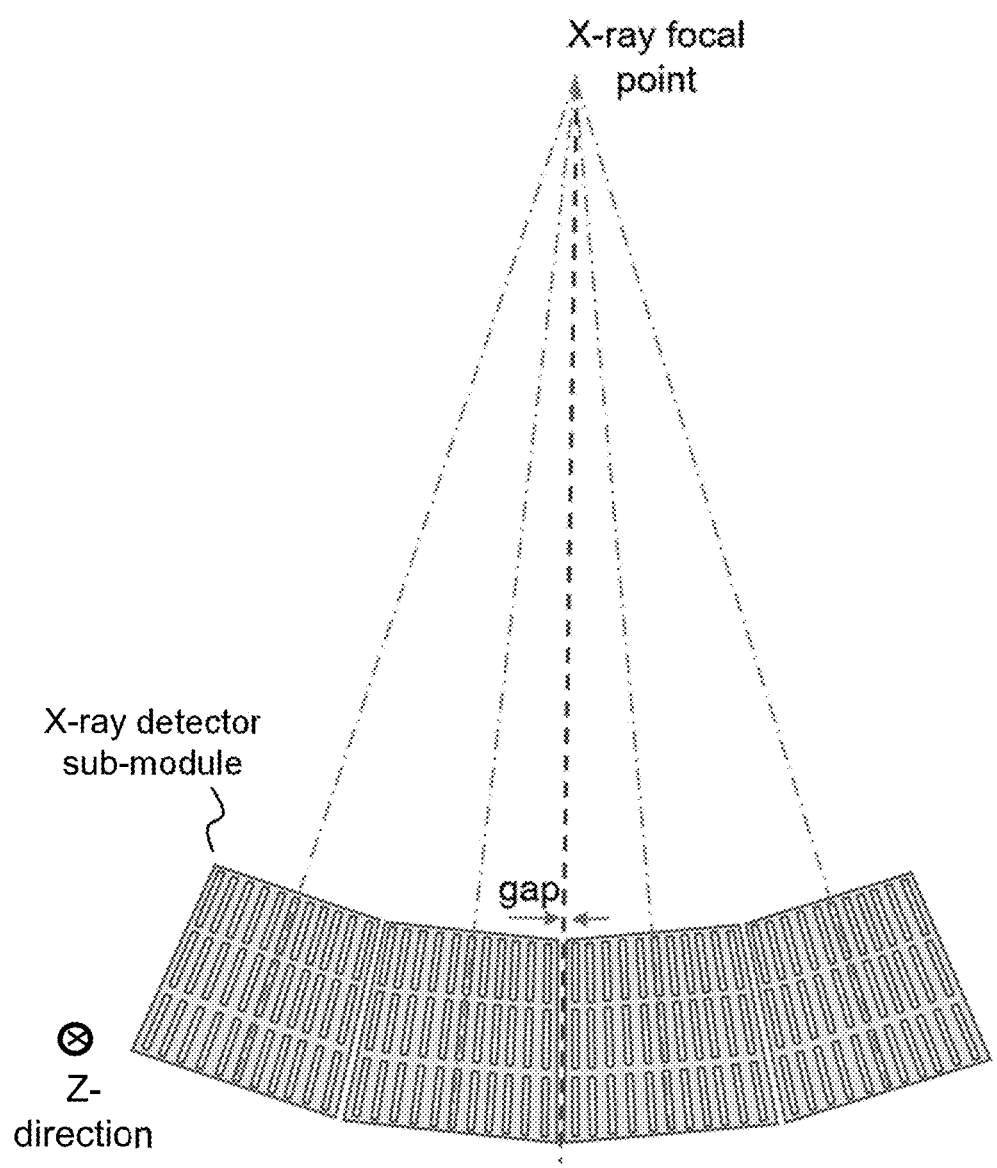
FIG. 13A is a schematic diagram illustrating an example of a modular x-ray detector comprising a number of detector sub-modules arranged side-by-side, e.g. in a slightly curved overall geometry with respect to an x-ray source located at an x-ray focal point.

FIG. 13A is a schematic diagram illustrating an example of a modular x-ray detector comprising a number of detector sub-modules arranged side-by-side in a slightly curved overall geometry with respect to an x-ray source located at an x-ray focal point.

Figure 13B:
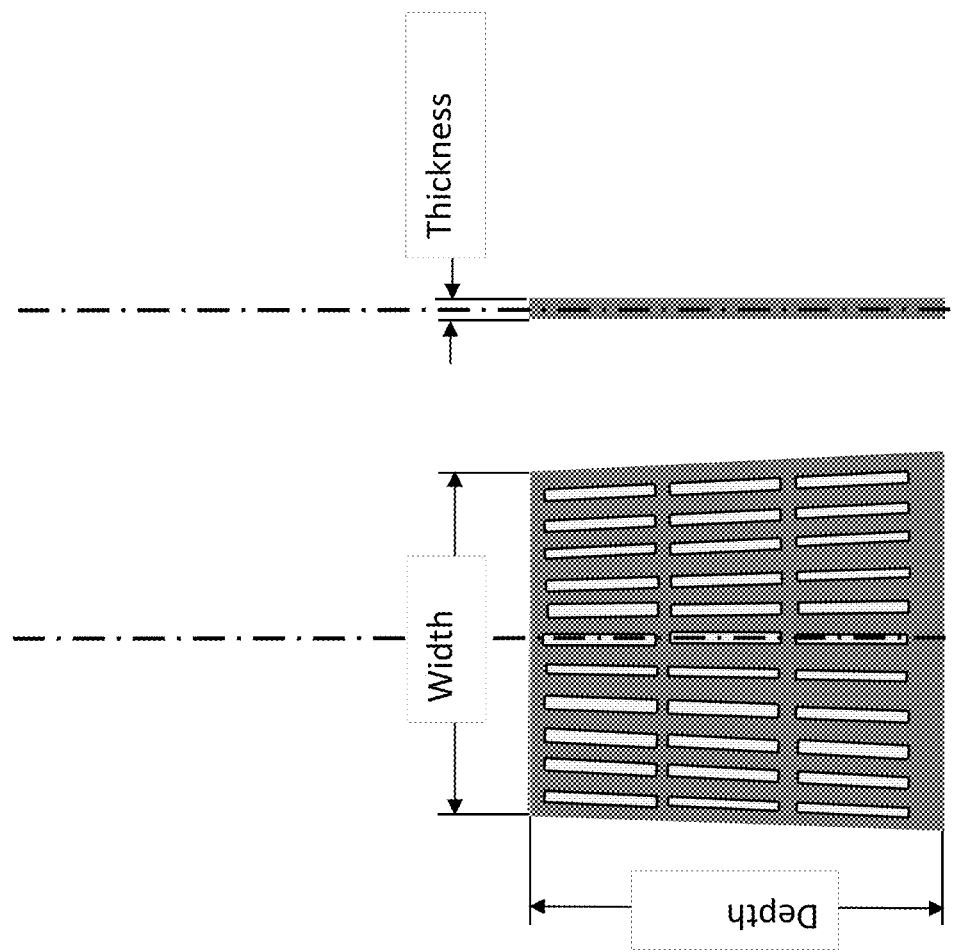
FIG. 13B is a schematic diagram illustrating an example of an individual x-ray detector sub-module.
Figure 13C:
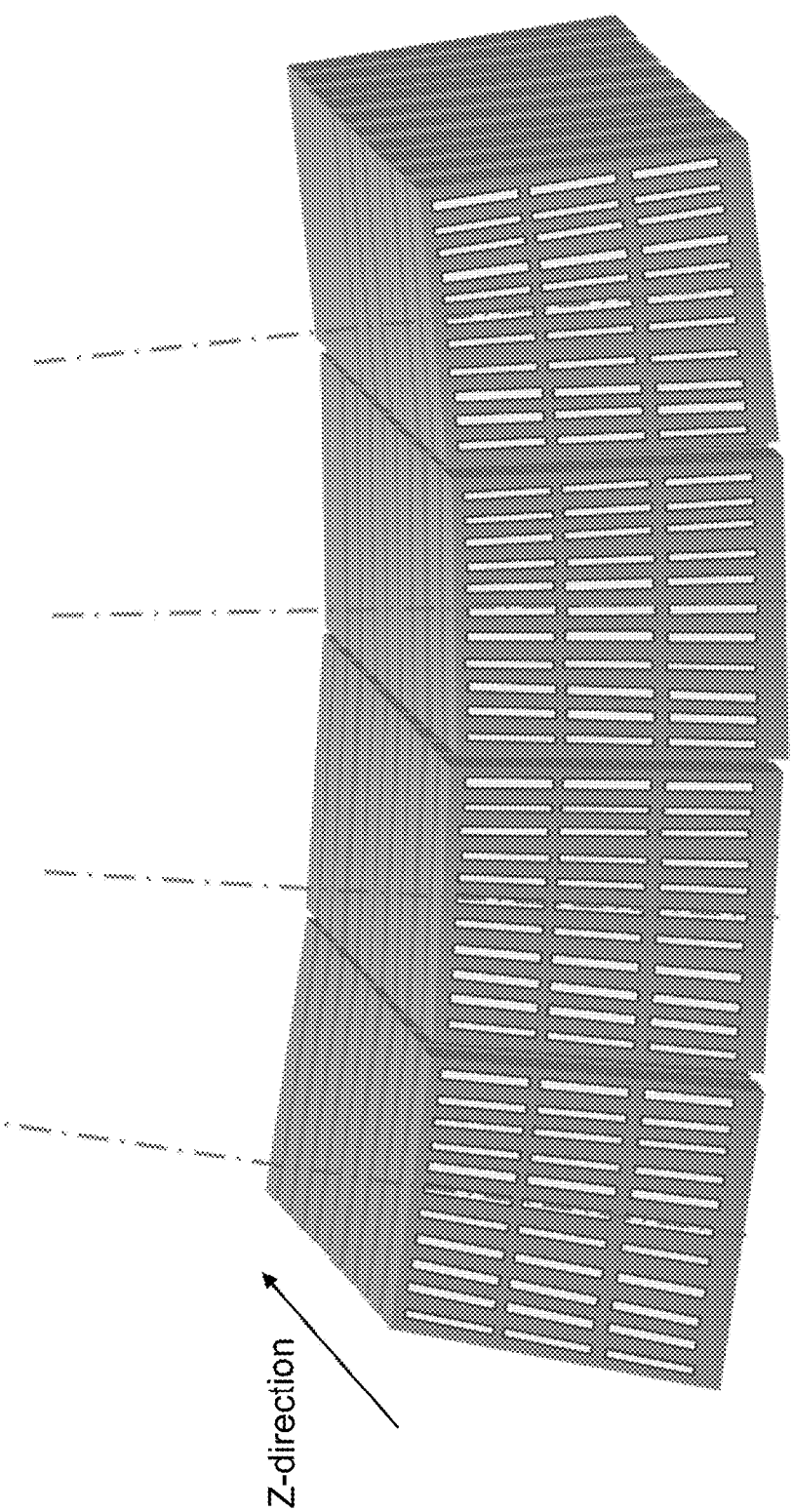
FIG. 13C is a schematic diagram illustrating an example of a modular x-ray detector comprising a number of detector sub-modules arranged side-by-side, and also stacked one after the other.

As mentioned, the detector sub-modules can be stacked one after the other (as shown in FIG. 13C) and/or arranged side-by-side (shown in FIG. 13A and FIG. 13C). The detector sub-modules may generally be arranged side-by-side, e.g. in a slightly curved overall configuration, in a direction substantially perpendicular to the z-direction. If desirable, detector sub-modules may also be stacked one after the other in the z-direction, indicated as going into the paper in the schematic diagram of FIG. 13A and explicitly shown in the example of FIG. 13C.

Figure 21:
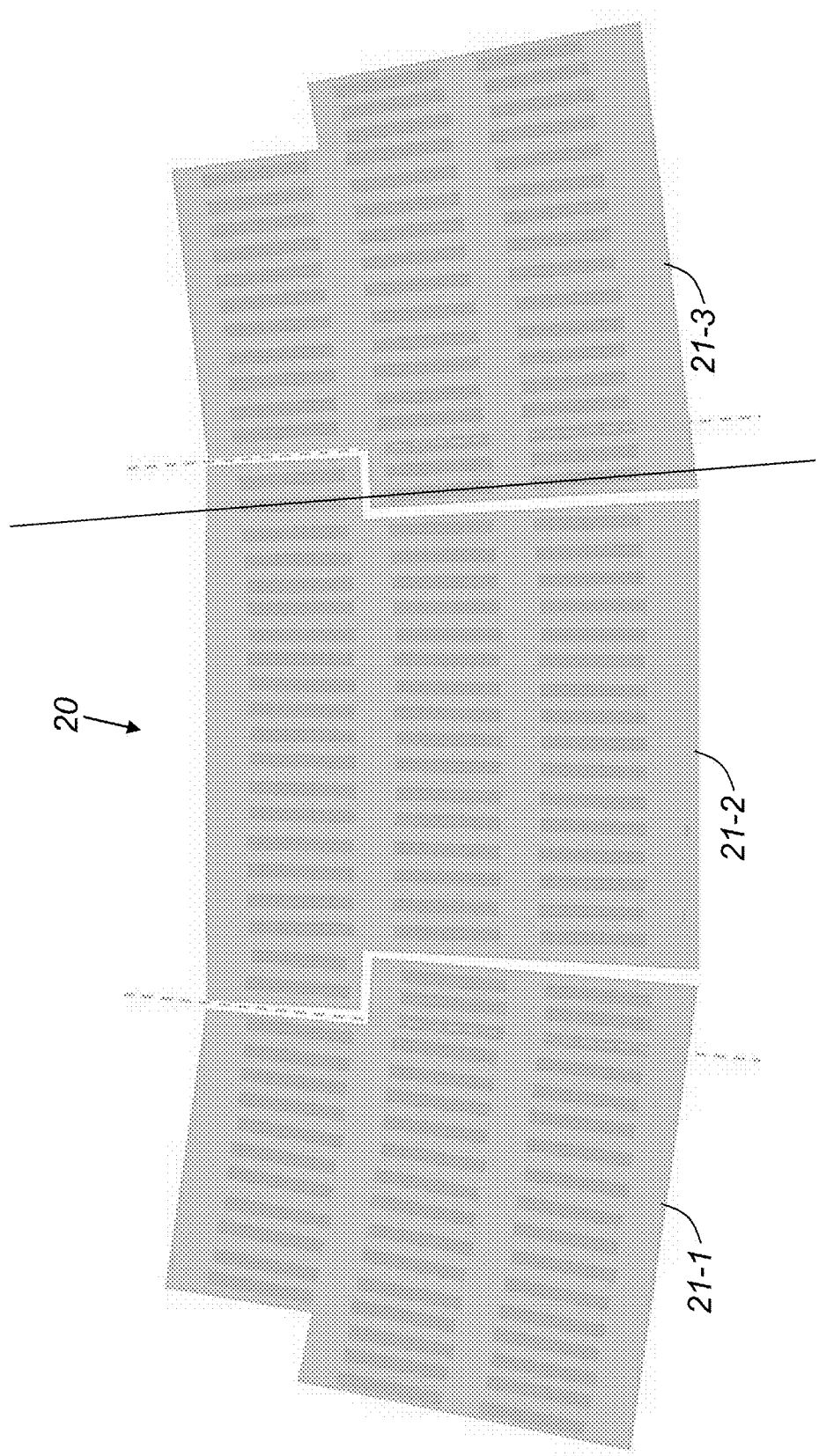

Although the detector sub-modules are arranged side-by-side in a direction substantially perpendicular to the z-direction in the following illustrations, it should be understood that other detector configurations may be conceivable where the sub-modules are arranged side-by-side substantially in the z-direction and/or optionally stacked in a direction substantially perpendicular to the z-direction, e.g. as illustrated in FIG. 21.

FIG. 13B is a schematic diagram illustrating an example of an individual x-ray detector sub-module.

FIG. 13C is a schematic diagram illustrating an example of a modular x-ray detector comprising a number of detector sub-modules arranged side-by-side, and also stacked one after the other. The x-ray detector sub-modules may be stacked one after the other to form larger detector modules that may be assembled together side-by-side to build up an overall x-ray detector.

Figure 14:
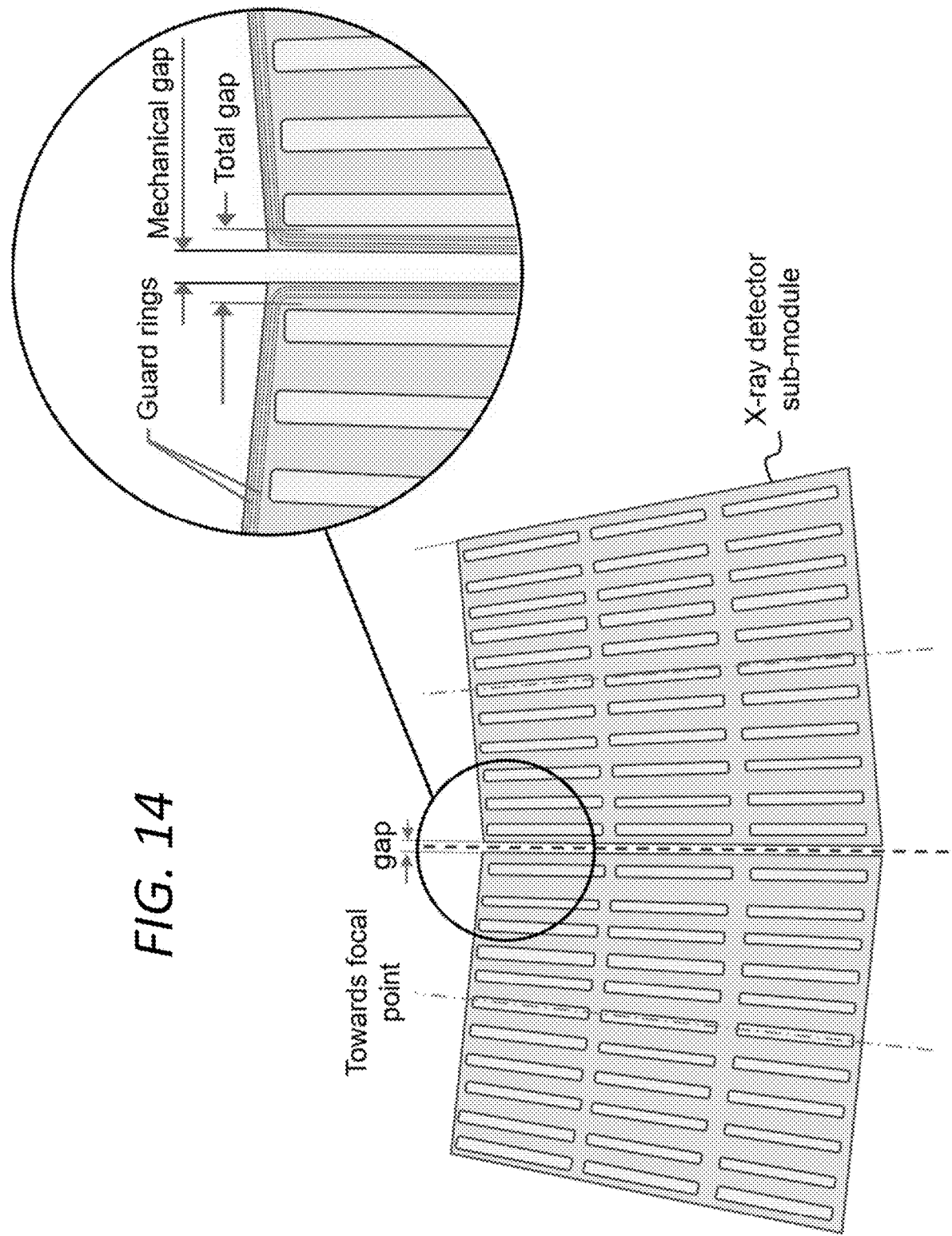
FIG. 14 is a schematic diagram illustrating an example of adjacent detector sub-modules arranged with a gap directed towards the focal point of the x-ray system.

FIG. 14 is a schematic diagram illustrating an example of adjacent detector sub-modules arranged with a gap directed towards the focal point of the x-ray system.

A typical feature on a silicon strip detector is a guard ring structure having a number of guard rings placed like borders near the edge around the x-ray sensor. The guard rings function as an important part of the x-ray sensor, but is also creating a zone of non-detecting areas along the edge or side of the x-ray sensor (i.e. the x-ray detector sub-module).

In addition, although the x-ray detector sub-modules are physically aligned side-by-side, there will anyway be a physical or mechanical gap between adjacent sub-modules due to physical or mechanical mounting tolerances. The mechanical gap and the non-detecting zone created by the guard rings will create a total gap between the active detection areas of the adjacent x-ray detector sub-modules. By way of example, the total gap may be defined as starting from the mid-point between the edge electrode and the guard ring on one of the detector sub-modules and ending at the mid-point between the guard ring and the edge electrode on the other one of the adjacent detector sub-modules.

In the prior art, the gap has been accepted as constituting dead detection area since the gap, due to the design and physical alignment of detector sub-modules, is in line with the x-ray path directed to the focal point of the x-ray source.

The inventors have recognized that it is indeed possible to reduce the dead areas or the effect from having the gap(s).

Figure 15:
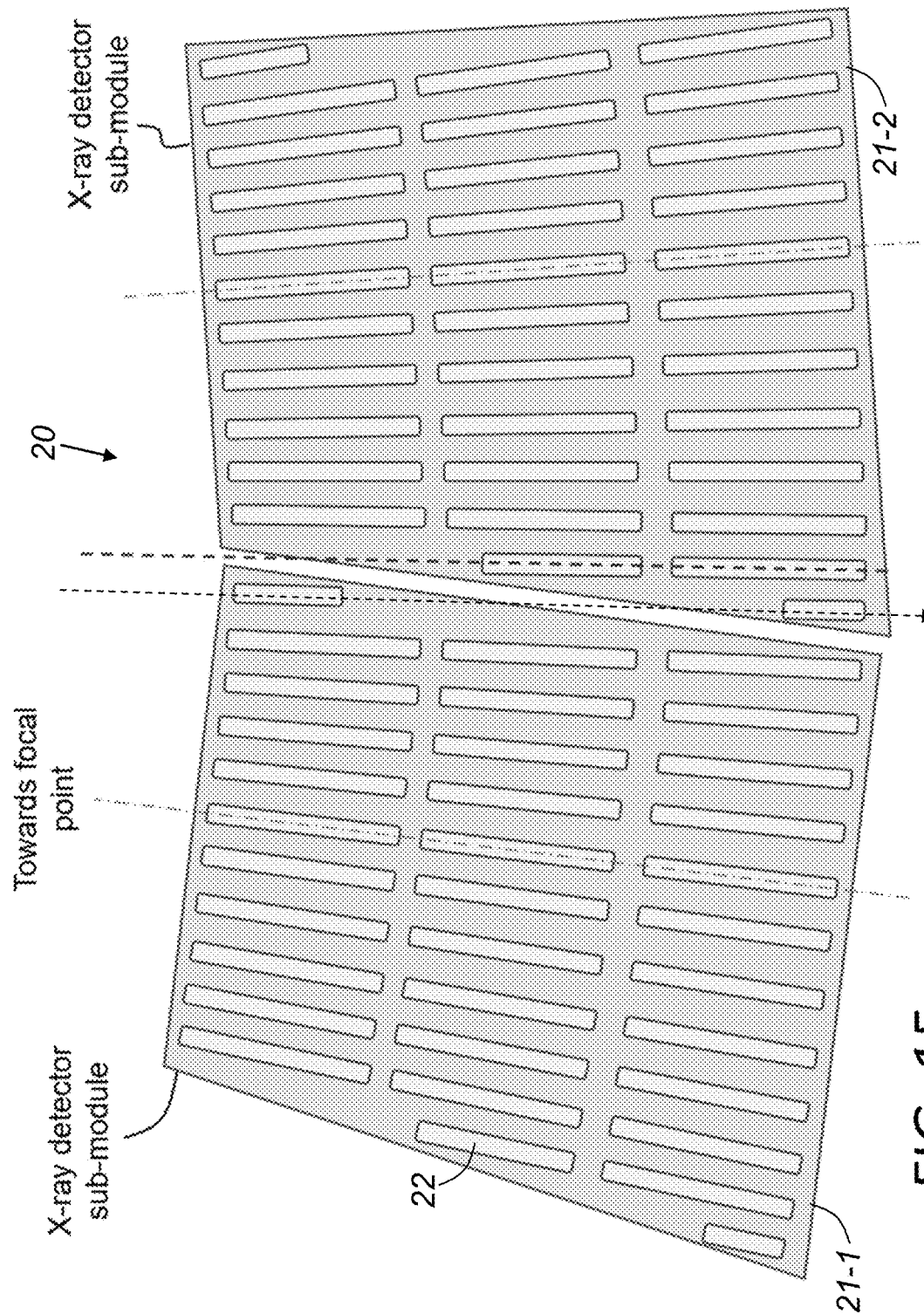
FIG. 15 is a schematic diagram illustrating an example of adjacent detector sub-modules designed and arranged such that the gap is not directed linearly towards the x-ray source.

FIG. 15 is a schematic diagram illustrating an example of adjacent detector sub-modules 21-1, 21-2 designed and arranged such that the gap is not directed linearly towards the x-ray source. With this design, at least part of the gap is not in line (out of line) with any x-ray path originating from the x-ray focal point to provide detection coverage by at least one of the detector sub-modules at the gap extension (crossover region) between the detector sub-modules 21-1, 21-2.

It can also be seen that the design provides detection coverage by at least one of the detector sub-modules (possibly both) at the gap extension (crossover region) between the sub-modules.

First, it can be seen that an x-ray that enters (see long-dashed line) into the gap at the top can actually be detected by one or more detector elements of the detector sub-module 21-2 because of the "slanted-edge" design since the gap extension is not directed linearly (out of line) towards the x-ray source.

Secondly, as illustrated by the short-dashed arrow in FIG. 15, it is indeed possible to make sure that the design provides overlapping detection coverage by both of the two adjacent detector modules (e.g. by an edge detector element of detector sub-module 21-1 at the top and an edge detector element of detector sub-module 21-2 at the bottom). In other words, an x-ray that passes through the x-ray detector sub-modules in the "gap area" can possibly be detected by detector elements 22 in both detector sub-modules 21-1, 21-2. According to a particular example, the output signals of detector elements 22 from two adjacent detector modules 21-1, 21-2 may thus be combined during subsequent signal processing, e.g. for photon counting. For example, the signal processing may be performed by the analog processing circuitry and/or the digital processing circuitry and/or by computerized digital signal processing.

As can be seen, the adjacent detector sub-modules 21-1, 21-2 may have detection areas (i.e. having detector elements) that are at least partially overlapping in the direction of incoming x-rays from the focal point.

For example, with reference to FIG. 15, the smallest detector element located at the edge of the sub-module 21-1 illustrated to the left is substantially in line (as seen from the x-ray focal point) with the smallest detector element located at the edge of the sub-module 21-2 illustrated to the right, thus effectively providing an overlap of detection areas of the adjacent detector sub-modules.

Other examples will be described with reference to FIGS. 18-20.

Figure 16:
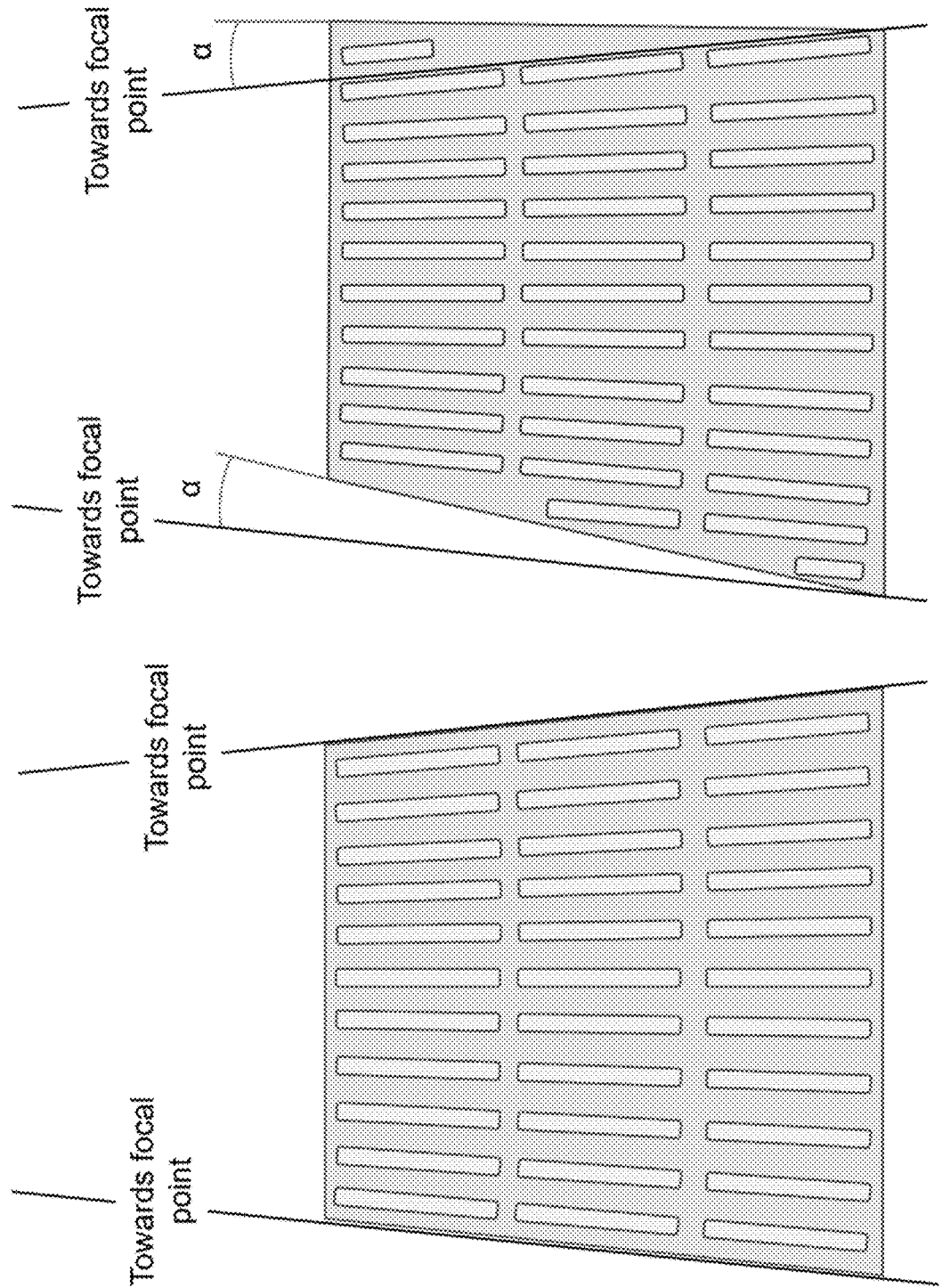
FIGS. 16A-B are schematic diagrams illustrating an example of a normal design of a detector sub-module compared to an example of a novel design of a detector sub-module.

FIGS. 16A-B are schematic diagrams illustrating an example of a normal design (FIG. 16A) of a detector sub-module compared to an example of a novel design (FIG. 16B) of a detector sub-module.

In the example of FIG. 16A, the detector sub-module is symmetrical and the side edges of the planar detector module are directed towards the focal point. In other words, an extended line following the edge on both sides of the detector sub-module are substantially pointing to the x-ray focal point.

In the example of FIG. 16B, the detector sub-module is asymmetrical in the sense that each of the sides or side edges has an angle α relative to a line pointing to the focal point, preferably the same magnitude of the angle but with a positive angle on one side and a negative angle on the other (opposite) side compared to the physical edge of the sub-module. When arranged side-by-side, in a direction substantially perpendicular to the direction of incoming x-rays, with a corresponding sub-module, this design caters for a gap that is not directed linearly towards the focal point of the system.

Figure 17:
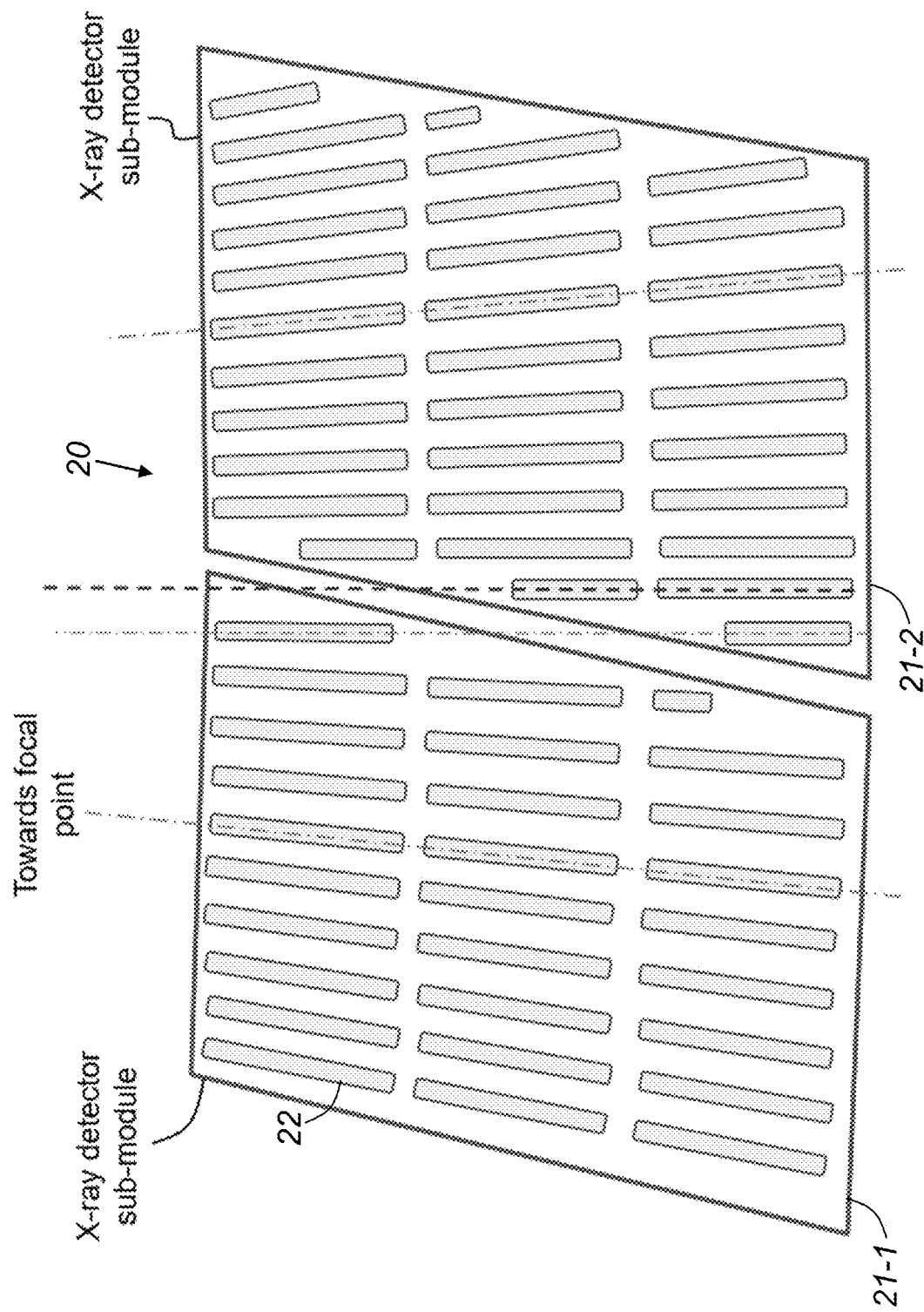
FIG. 17 is a schematic diagram illustrating another example of adjacent detector sub-modules designed and arranged such that the gap is not directed linearly towards the x-ray source.

FIG. 17 is a schematic diagram illustrating another example of adjacent detector sub-modules designed and arranged such that the gap is not directed linearly towards the x-ray source. In this particular example, the detector sub-modules 21-1, 21-2 are basically designed as parallelograms, arranged side-by-side such that the gap between the sub-modules is not directed linearly towards the focal point of the system.

Figure 18:
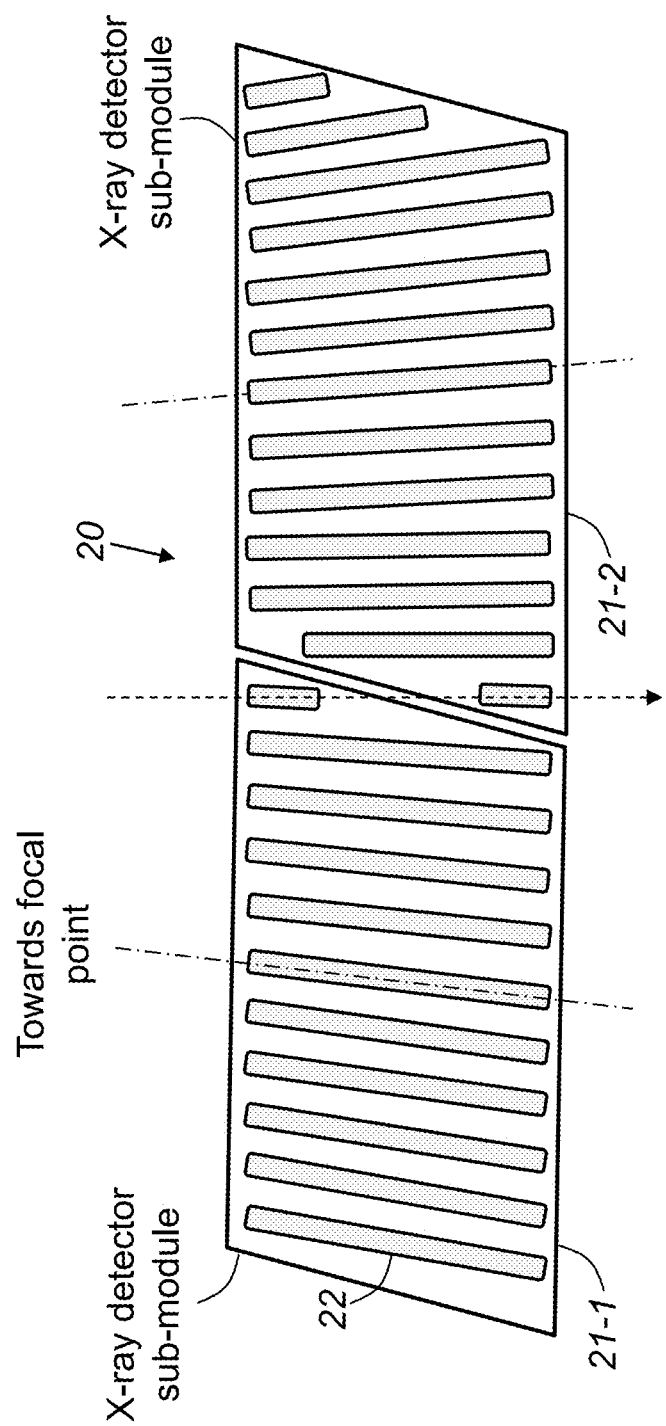
FIG. 18 is a schematic diagram illustrating yet another example of adjacent detector sub-modules designed and arranged such that the gap is not directed linearly towards the focal point of the system.

FIG. 18 is a schematic diagram illustrating yet another example of adjacent detector sub-modules designed and arranged such that the gap is not directed linearly towards the focal point of the system. In this particular example, the detector sub-modules are not depth-segmented, and it is clearly shown how the proposed technology can be applied also to non-segmented detector sub-modules.

It also clear that the detector sub-modules of FIG. 18 are oriented edge-on, with detector elements extending in at least two directions, wherein one of the directions has a component in the direction of incoming x-rays. Expressed slightly different, the detector elements extend at least partially (substantially) in the direction of the incoming x-rays.

Figure 19:
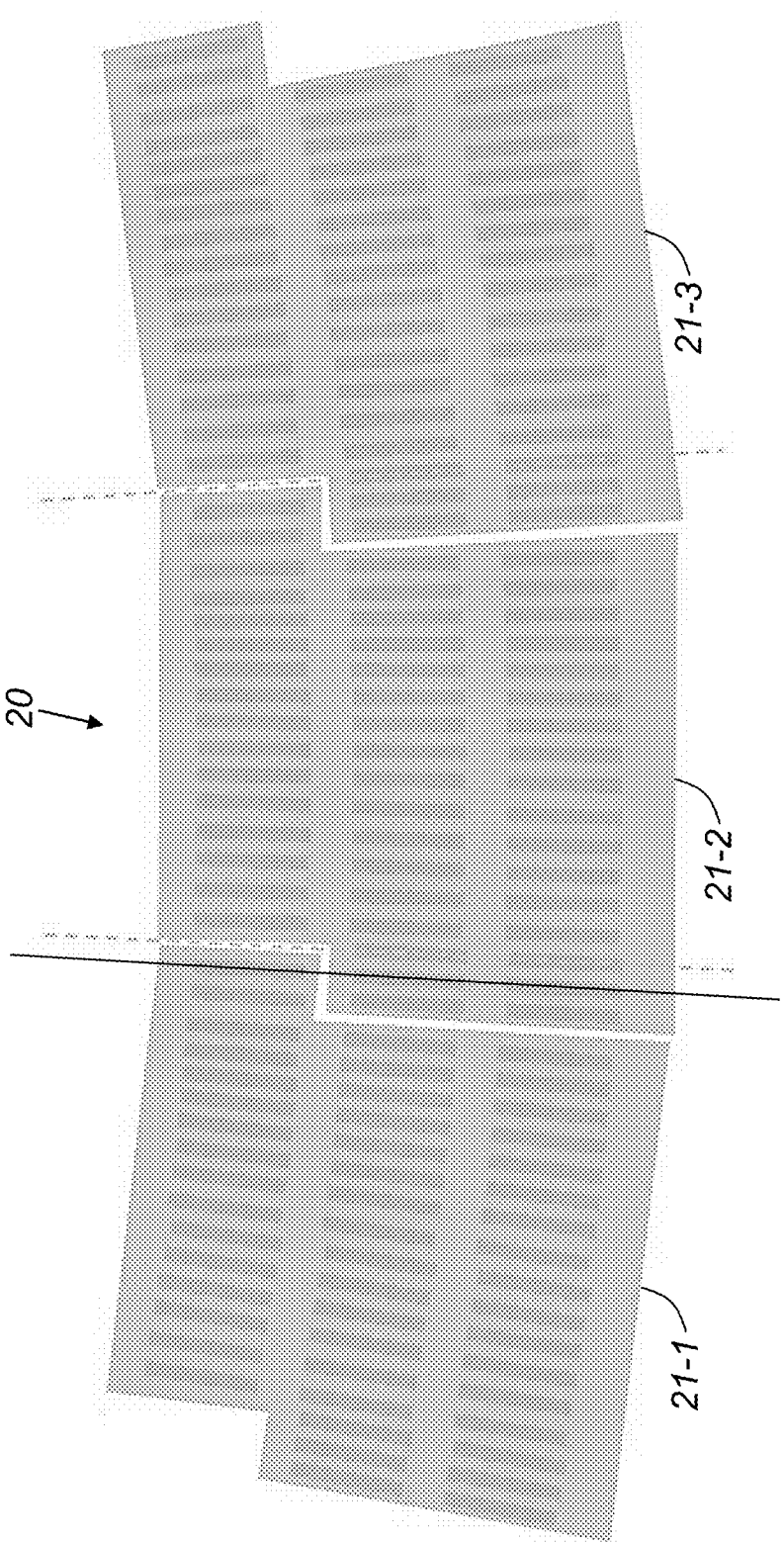
FIGS. 19-21 are schematic diagrams illustrating various examples of contour designs where at least part of the gap between two adjacent detector sub-modules is not directed towards the x-ray source.
Figure 20:
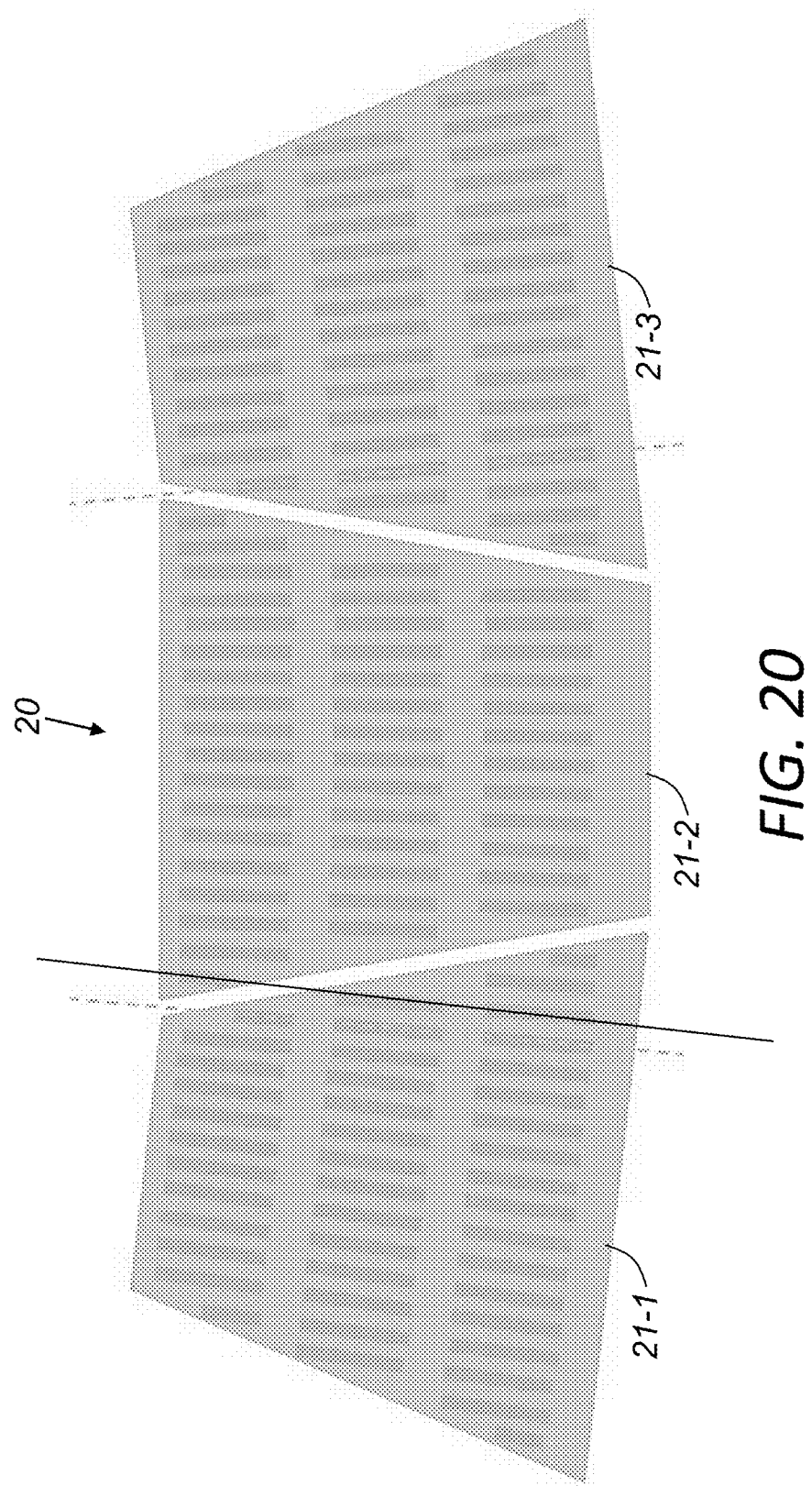

FIGS. 19-21 are schematic diagrams illustrating various examples of contour designs where at least part of the gap between two adjacent detector sub-modules is not directed towards the x-ray source.

FIG. 19 is a schematic diagram illustrating an example of an x-ray detector 20 having at least three detector sub-modules 21-1, 21-2, 21-3 arranged side-by-side in a direction substantially perpendicular to the direction of the incoming x-rays from an x-ray source with which the x-ray detector 20 is intended to be used. In this example, the sides or side edges of the detector sub-modules 21-1, 21-2, 21-3 have a step-like configuration.

FIG. 20 is a schematic diagram illustrating another example of an x-ray detector 20 having at least three detector sub-modules 21-1, 21-2, 21-3 arranged side-by-side in a direction substantially perpendicular to the direction of the incoming x-rays from an x-ray source with which the x-ray detector 20 is intended to be used. In this example, the sides or side edges of the detector sub-modules 21-1, 21-2, 21-3 are slanted sides or edges (with respect to the direction of the incoming x-rays). In this particular case, the detector sub-modules 21-1, 21-2, 21-3 have mutually fitting trapezoidal forms.

FIG. 21 is a schematic diagram illustrating yet another example of an x-ray detector 20 having at least three detector sub-modules 21-1, 21-2, 21-3 arranged side-by-side in a direction substantially perpendicular to the direction of the incoming x-rays from an x-ray source with which the x-ray detector 20 is intended to be used. In this example, the sides or side edges of the detector sub-modules 21-1, 21-2, 21-3 have a step-like configuration, but representing a variation compared to the configuration shown in FIG. 19.

In general, the side profile of the detector sub-modules may be configured with one or more steps.

As mentioned, adjacent detector sub-modules may have detection areas that are at least partially overlapping in the direction of incoming x-rays from the focal point.

In a particular example, at least one detector element located closest to the gap, i.e. edge element(s), of a first detector sub-module may be situated in line with (in the direction towards the focal point) at least one detector element not located closest to the gap, i.e. not edge element(s), of a second detector sub-module, e.g. as can be seen with the detector elements of the adjacent detector sub-modules along the solid line in FIG. 19, FIG. 20 and FIG. 21.

This may be useful since edge elements of a detector sub-module may be at least partially assisted by non-edge elements of an adjacent detector sub-module.

Figure 22:
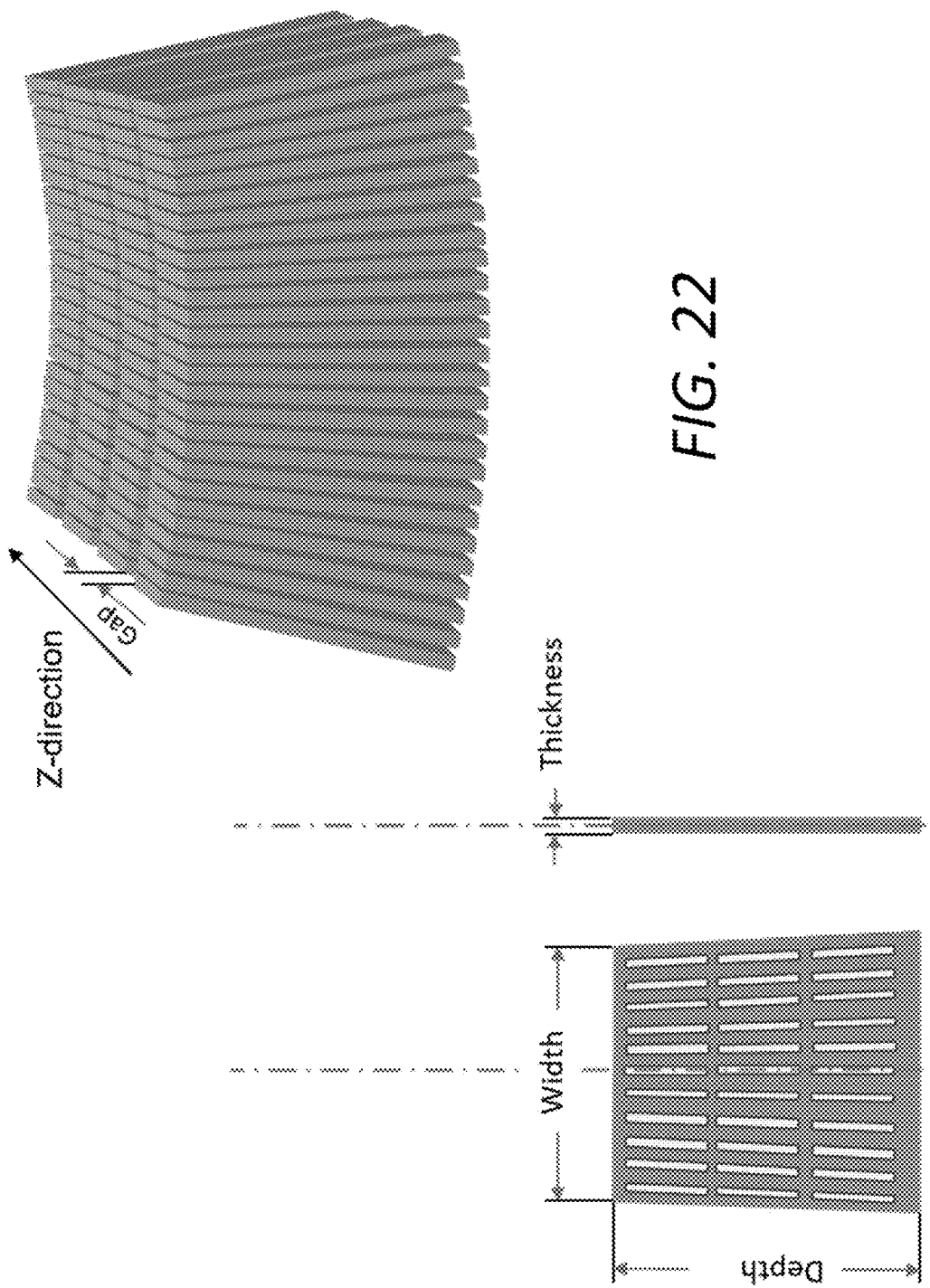
FIG. 22 is a schematic diagram illustrating an example of an alternative configuration and design of a modular x-ray detector.
Figure 23:
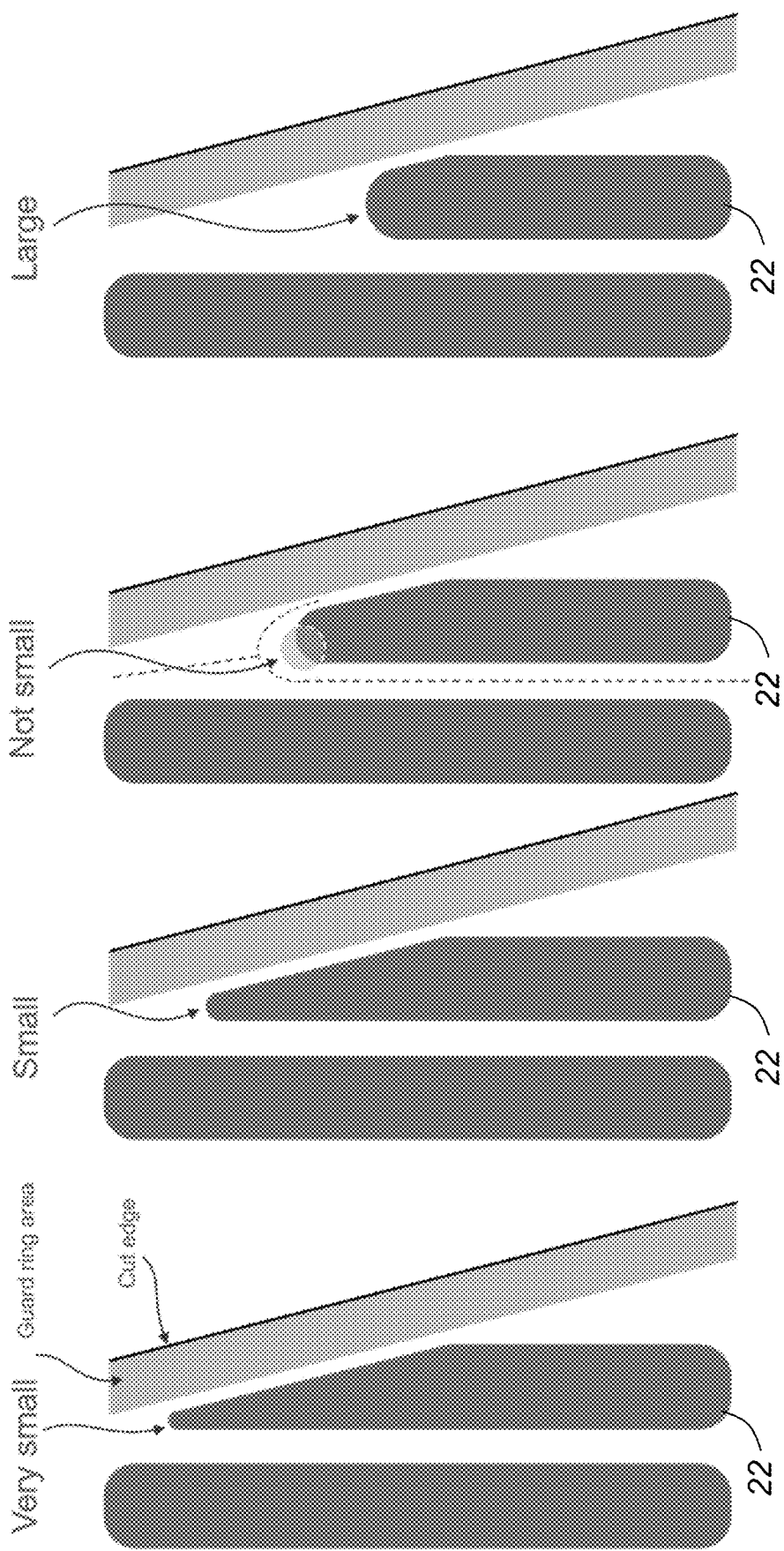
FIGS. 23A-D are schematic diagrams illustrating examples of tapered edge segments of various geometrical configurations.

FIG. 22 is a schematic diagram illustrating an example of an alternative configuration and design of a modular x-ray detector. In this particular example, the detector sub-modules are arranged side-by-side substantially in the z-direction of a CT system and stacked in a direction substantially perpendicular to the z-direction.

It should be understood that the x-ray detector sub-modules may be arranged side-by-side in any arbitrary direction in a x-ray system, as long as they form an x-ray detector with an effective x-ray detection area.

As can be seen, the x-ray detector sub-modules are typically planar modules, and the detector sub-modules are normally arranged side-by-side in the in-plane direction of the detector sub-modules.

As previously indicated, edge-on x-ray detectors such as edge-illuminated silicon sensors may be shaped and patterned with electrodes in a manner that allows them to overlap slightly when placed adjacent to each other. This eliminates or at least reduces the gap in active detection area that would otherwise occur from the mechanical gap and insensitive guard rings that occupy the edges of each sensor.

The effect of such gaps is difficult to correct with typical interpolation methods because the data is consistently missing from the sinogram along an entire row. The idea of overlapping sensors (modules/sub-modules) may eliminate the gap, enabling a feasible detector architecture with greatly simplified corrections, or perhaps no corrections if calibration procedures turn out to be sufficient.

Various examples of further embodiments, adaptations, developments and/or improvements as well as related concepts are described below.

By way of example, the proposed technology may include one or more of the following:

Modified electrode patterns at slanting edges to maximize sensitive silicon area.

Several different variations of overlapping including different versions of discrete steps.

Modified guard ring structures to reduce empty space at the edges when the sloped edge of the sensor cuts across the rectangular columns of pixels.

Rounded corners (with at least minimum radius of curvature) to avoid electrical hot spots that might lead to premature voltage breakdown.

Options for routing readout traces along edges that extend beyond the base of the sensor.

Placement of anti-scatter collimator blades to optimize the uniformity of response across the overlapping region.

Design of edge pixels for slanted-edge sub-modules, e.g. based on diodes/electrodes (or more generally detector elements) having (truncated) trapezoidal or triangular shapes. The (truncated) trapezoidal or triangular diodes/electrodes or detector elements may be arranged in depth segments along the slightly slanted edge.

For example, as can be understood and appreciated, the detector elements at the slanted side edge of a detector sub-module may include tapered edge segments such as trapezoidal or triangular segments and/or truncated trapezoidal or triangular segments with rounded corners that are arranged in depth segments along the slanted side edge.

FIGS. 23A-D are schematic diagrams illustrating examples of tapered edge segments 22 (electrodes/diodes) of various geometrical configurations. In particular, examples of different sizes of the tip radius of the tapered edge segments 22 are illustrated. As illustrated, the tapered edge segments 22 have rounded corners at the tip with a certain tip radius.

Narrow points at the ends of the edge segments 22 (electrodes/diodes) may concentrate the electric field, and there seems to be a minimum allowed radius to avoid breakdown effects. It is therefore envisaged that the tip radius should not be too small. As an example, a possible criterion is for the tip radius to be equal to or larger than the charge cloud radius.

Figure 24:
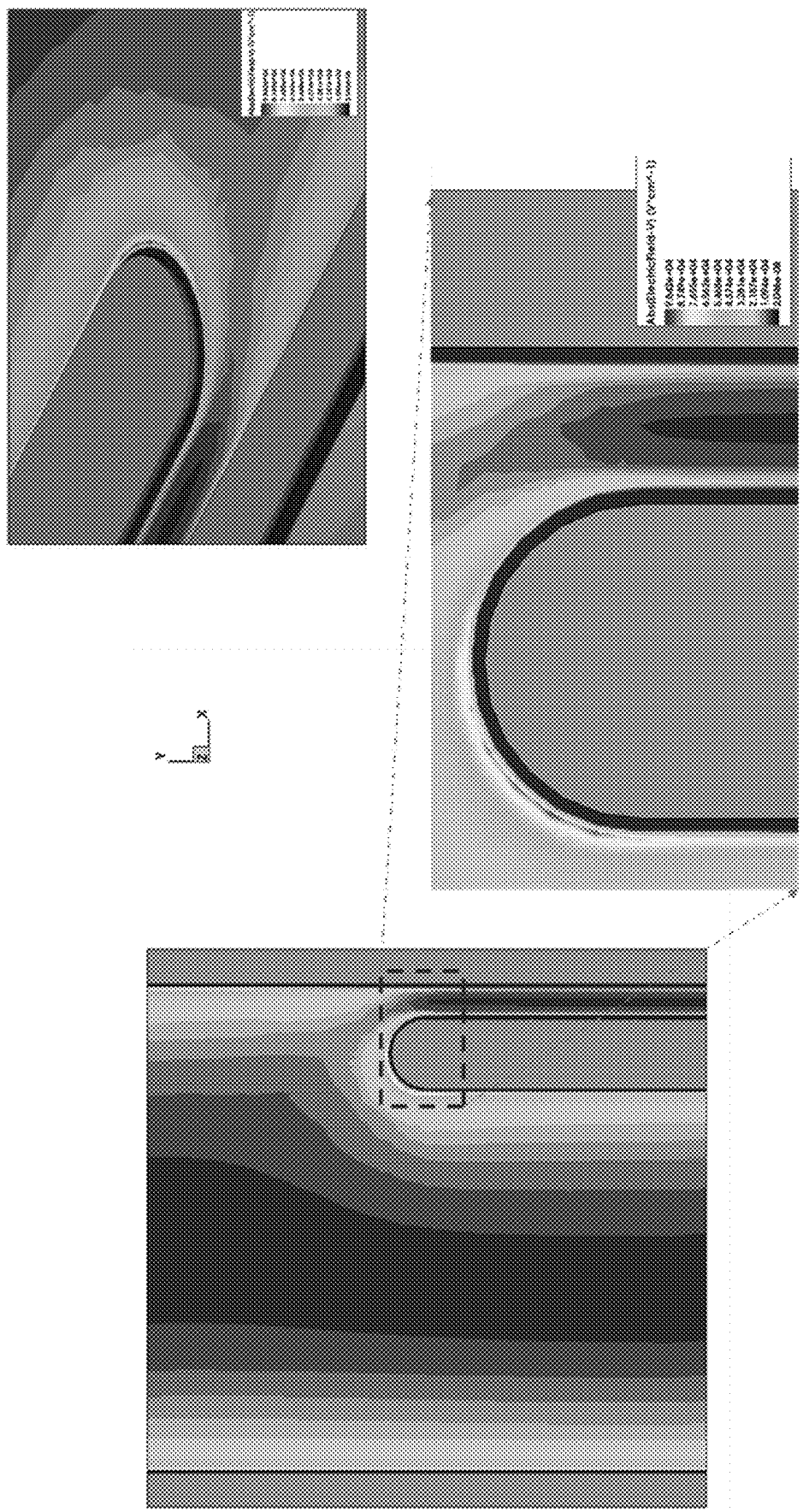
FIG. 24 is a schematic diagram illustrating an example of the electric field enhancement at the electrode tip when the radius of the tip is relatively small.

FIG. 24 is a schematic diagram illustrating an example of the electric field enhancement at the electrode tip when the radius of the tip is relatively small.

Figure 25B:
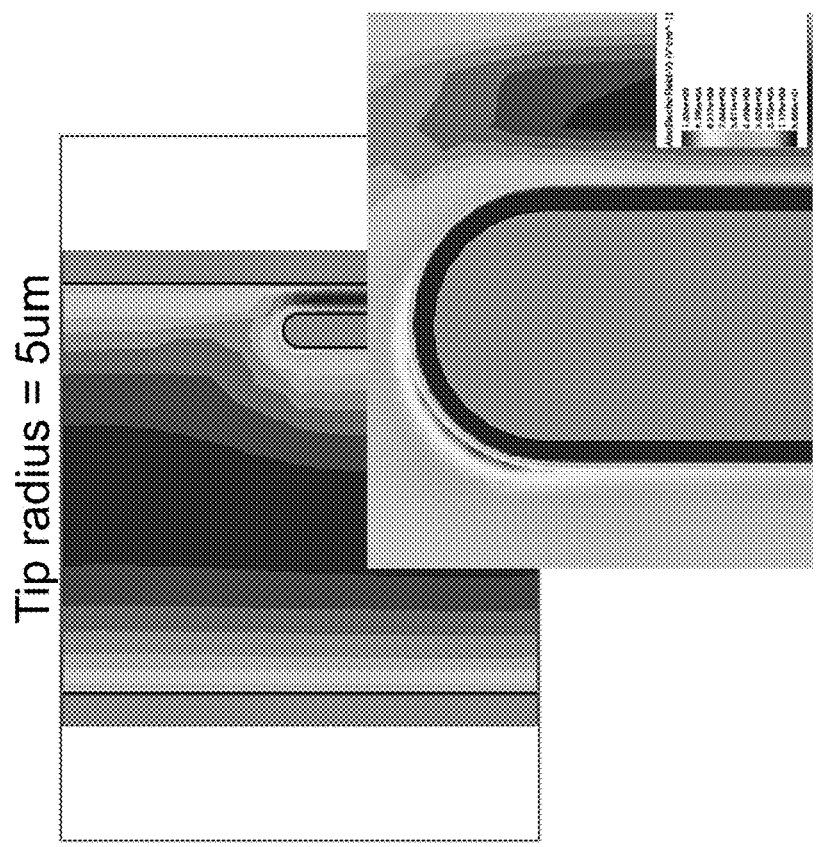
FIGS. 25A-B are schematic diagrams illustrating examples of the electric field enhancement at the electrode tip for two different sizes of the tip radius.
Figure 25A:
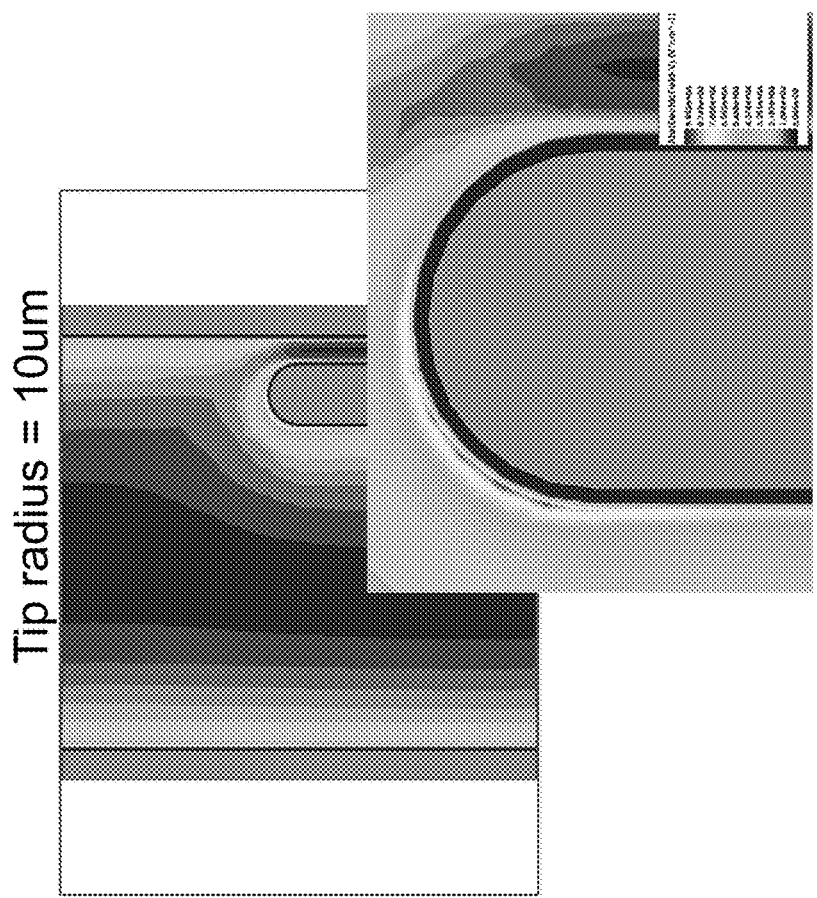

FIGS. 25A-B are schematic diagrams illustrating examples of the electric field enhancement at the electrode tip for two different sizes of the tip radius. By way of example, experiments have shown that the there is a 7% increase in the maximum electric field for a mere change in tip radius from 10 μm to 5 μm.

However, simply cutting off the edge segment at its minimum allowed radius obviously reduces the extension/height of the segment (electrode/diode). Under certain circumstances, this may lead to various effects.

For example, it may be beneficial to modify electrode patterns of the detector elements to maintain the effective detection area and/or to minimize empty silicon sensor area. By way of example, this may be achieved by extending (at least one of) the edge detector elements (electrodes/diodes) towards the corresponding neighboring detector element(s) and/or by extending (at least one of) the neighboring detector elements towards the edge detector elements. Extension of the edge segment(s) is also useful for increasing the radius of the tip of the edge segment.

In other words, it may be advisable to have a configuration where the width of at least part of an edge detector element (electrode/diode) is larger than the width of a neighboring detector element (electrode/diode) and/or a configuration where the width of at least part of a neighboring detector element is larger than the normal (largest width) of a corresponding edge detector element.

FIGS. 26A-B are schematic diagrams illustrating different examples of electrode modifications in connection with tapered edge segments. In this example, neighboring detector elements 22-1 are extended towards the edge in the area where the tapered edge element or segment 22-2 where cut off, e.g. to provide enhanced detection coverage. In other words, the neighbor detector element 22-1 may be bulged outwards towards the edge by modifying the neighbor detector element width to minimize empty detection area. In a sense, the neighboring detector element 22-1 extends into the detection line of an edge detector element 22-2. This represents an illustrative example of the case where width of at least part of a neighboring detector element 22-1 is larger than the normal (largest width) of a corresponding edge element 22-2.

The inventors have also realized that cutting the tapered edge segments (electrodes) to provide a reasonable (minimum allowed) tip radius may increase the distance from the guard ring structure, and more particularly the inner Current Capture Ring (CCR) of the guard. It may be beneficial to modify the guard ring structure so that it follows the detector elements (electrodes/diodes) at the edge more closely, especially if the empty space around the top of a cut and tapered edge electrode is not filled by extending the neighboring electrode into that area.

Therefore, it is optionally suggested to modify at least a section of the guard ring structure of a sub-detector module accordingly. By way of example, a section of the implant and/or a section of at least one of the guard rings may be expanded or modified to allow the overall guard ring structure to more closely follow the electrodes of the detector elements at the edge of the sensor area.

Figures 27A, 27B, 27C:
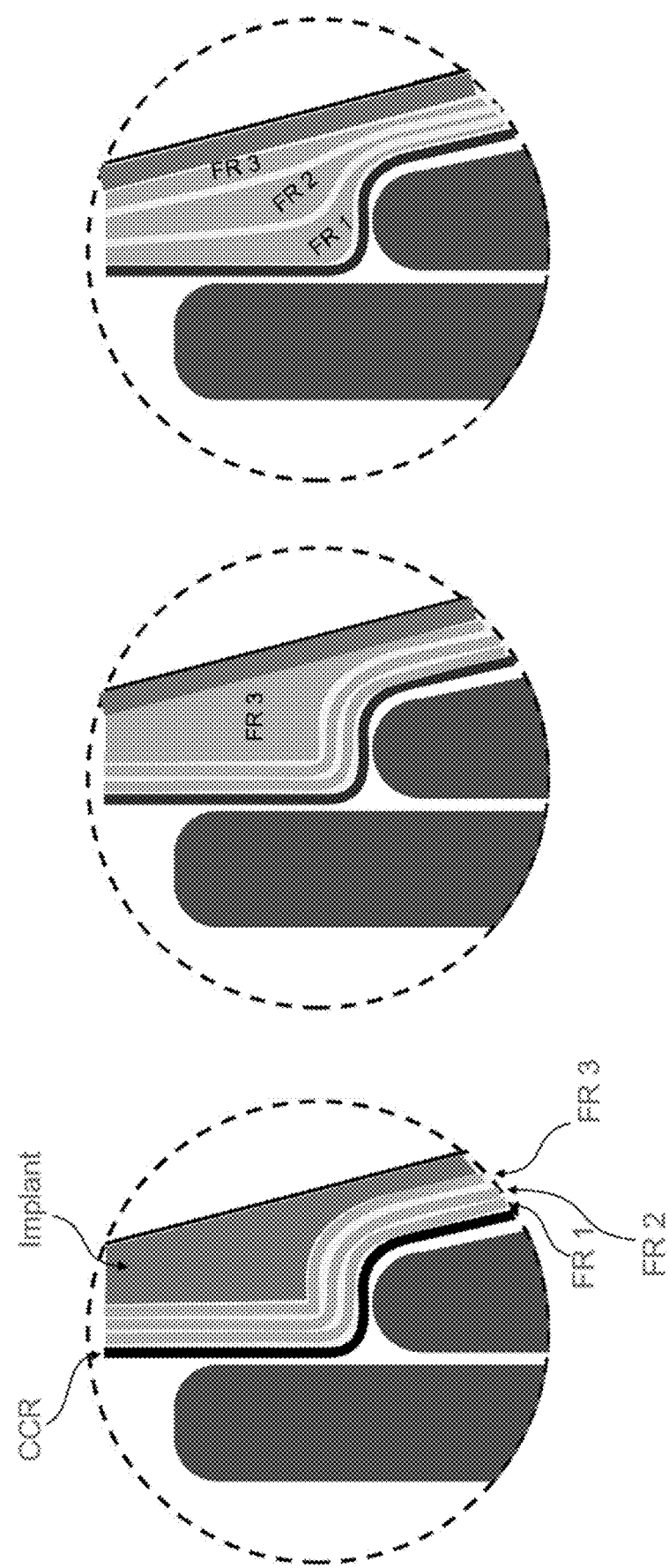
FIGS. 27A-C are schematic diagrams illustrating different examples of guard ring options for tapered edge segments.

FIGS. 27A-C are schematic diagrams illustrating different examples of guard ring options for tapered edge segments. In these examples, the overall guard ring includes an implant, a number of Floating Rings (FR) and an inner Current Capture Ring (CCR). As an example, the number of floating rings is three, but the proposed technology is not limited thereto. Rather, any suitable number of floating rings may be used.

In the example of FIG. 27A, a section of the implant is expanded to enable the CCR (and FRs) to follow the profile of electrodes at the edge of the sensor area of the detector sub-module.

In the example of FIG. 27B, a section of one of the floating rings (FR 3) is expanded to enable the CCR (and FRs) to follow the profile of electrodes at the edge of the sensor area of the detector sub-module.

In the example of FIG. 27C, a section of each of the floating rings is expanded to enable the CCR (and FRs) to follow the profile of electrodes at the edge of the sensor area of the detector sub-module.

Another aspect of the new detector design is that the electric physical wiring or routing of traces from the detector elements (electrodes/diodes) to the readout circuitry may be affected by the slanted design of the detector sub-modules in the overlapping gap region, making the wiring more difficult due to space constraints. Also, improper routing may lead to increased capacitance, which contributes to noise.

Figure 28:
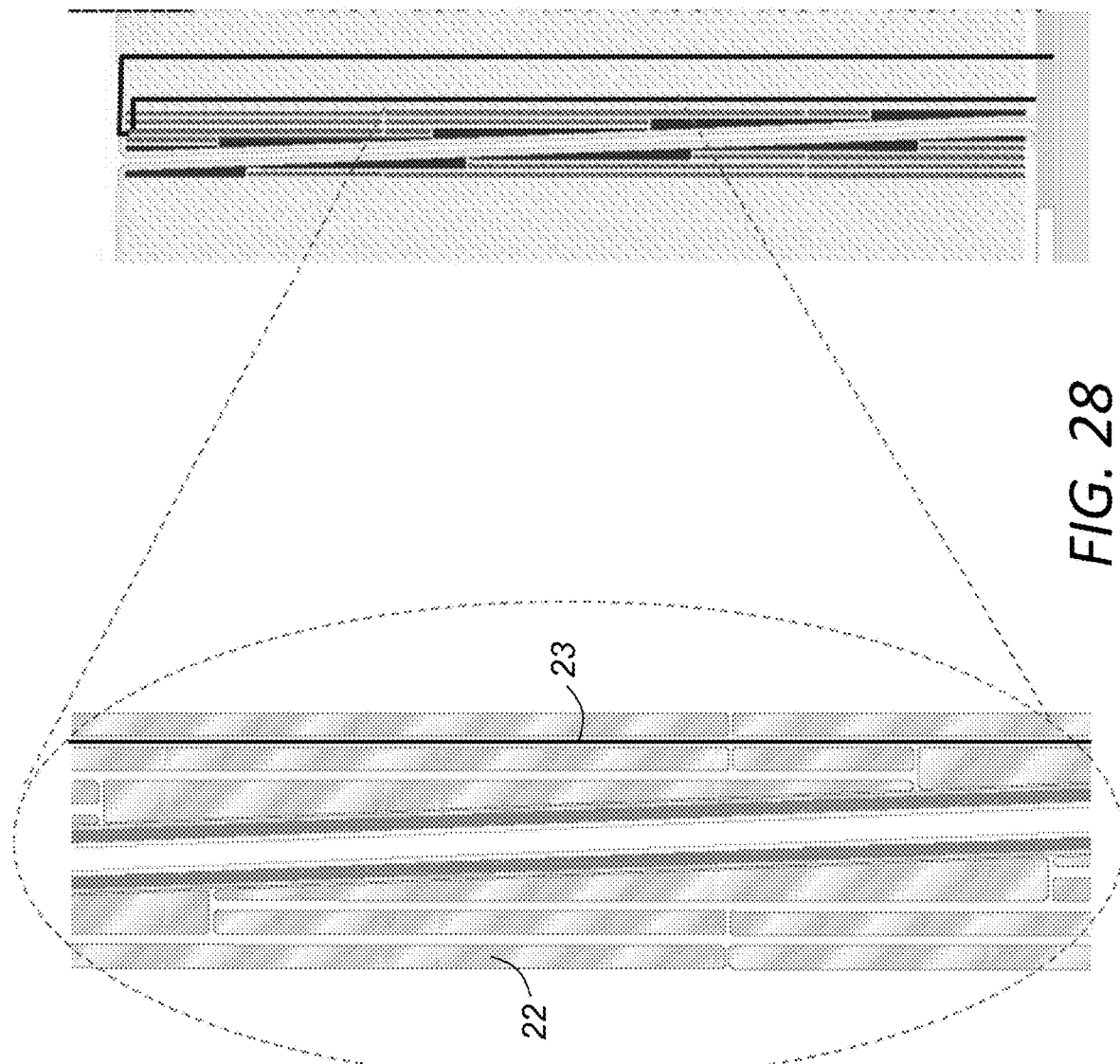
FIG. 28 is a schematic diagram illustrating an example of arranging for (redirecting) routing traces from a certain detector element in the slanted region to be routed to the readout circuit utilizing the gap(s) between detector elements in the non-slanted region.

FIG. 28 is a schematic diagram illustrating an example of arranging for (redirecting) routing traces from a certain detector element (diode/electrode) in the slanted region to be routed to the readout circuit utilizing the gap(s) between detector elements (diodes/electrodes) in the non-slanted region.

In other words, the wiring traces 23 from a certain edge detector element (diode/electrode) in the gap region can also be routed to the readout pad utilizing the gaps between the detector elements 22 several steps away from the edge (i.e. in the region with regular shape of the detector elements).

Figure 29:
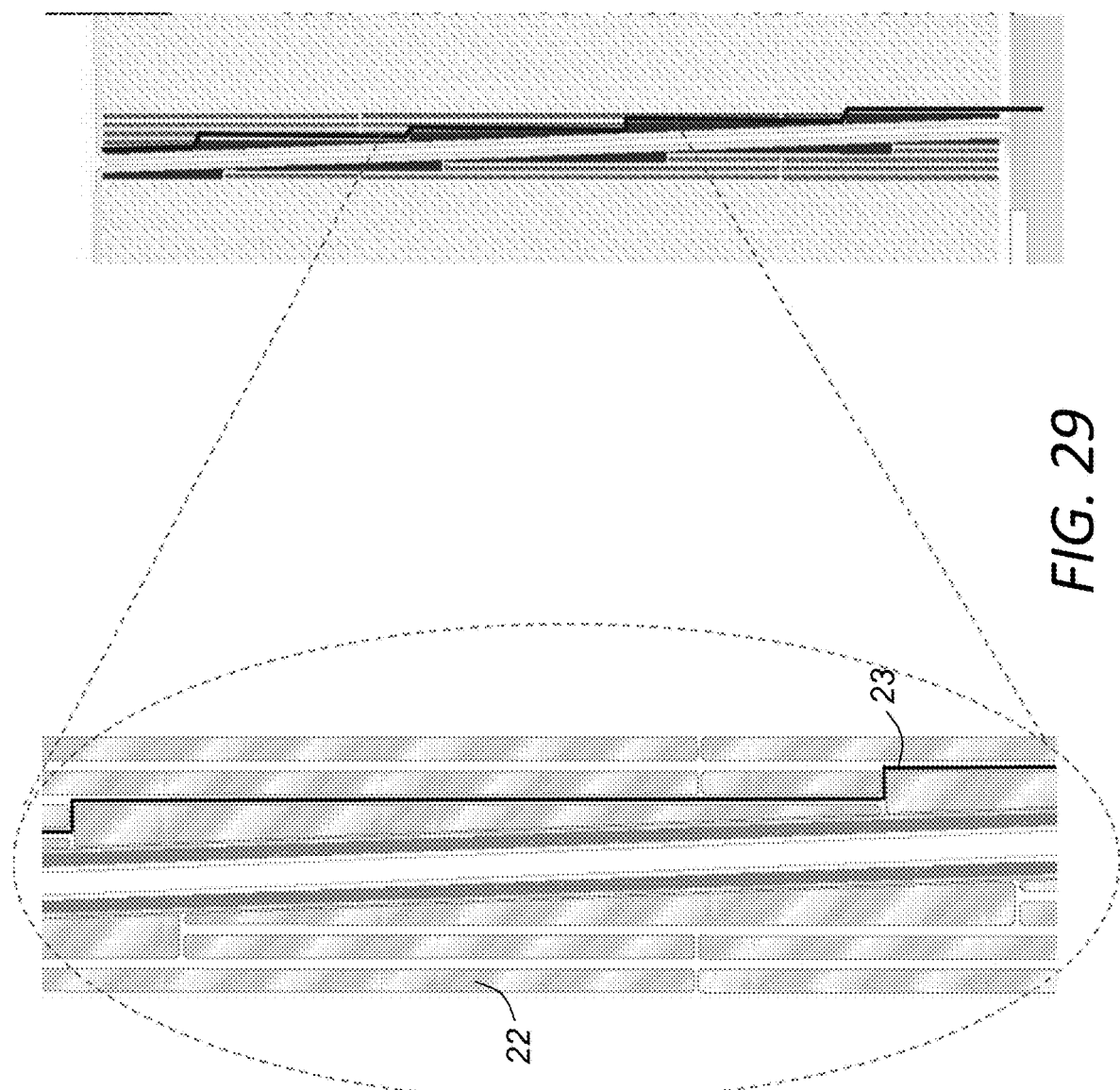
FIG. 29 is a schematic diagram illustrating an example of arranging for routing traces from a certain edge detector element to be routed to the readout circuit utilizing the gap(s) between the edge detector elements and their neighboring detector elements.

FIG. 29 is a schematic diagram illustrating an example of arranging for routing traces from a certain edge detector element to be routed to the readout circuit utilizing the gap(s) between the edge detector element and their neighboring detector elements.

In other words, the wiring traces 23 from a certain edge detector element (diode/electrode) in the gap region can be routed to the readout pad through gaps between the edge detector elements and their neighboring detector elements.

Figure 30:
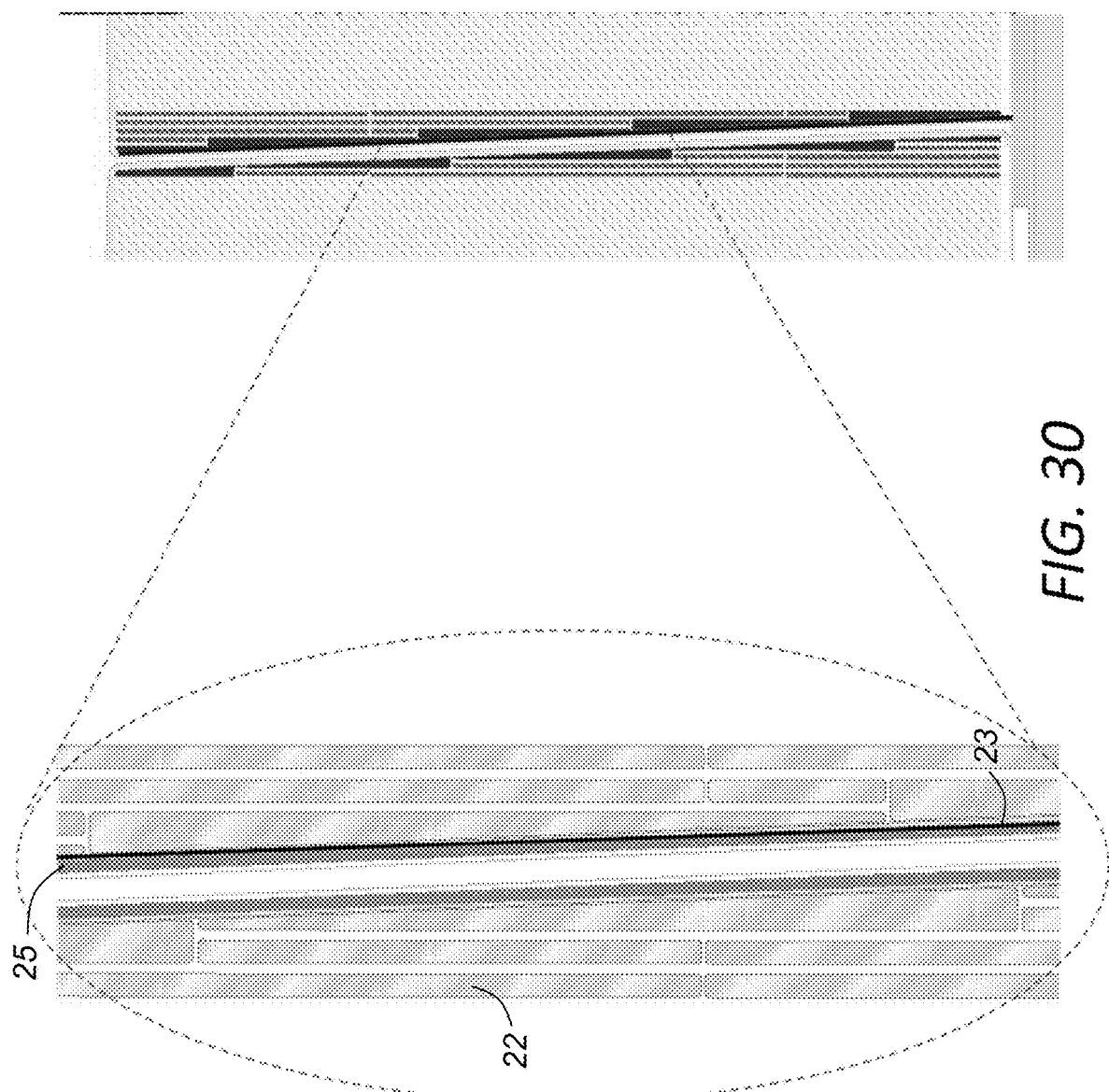
FIG. 30 is a schematic diagram illustrating an example of arranging for routing traces from a certain edge detector element to be routed to the readout circuit utilizing the gap(s) between the guard ring structure and the edge detector elements.

FIG. 30 is a schematic diagram illustrating an example of arranging for routing traces from a certain edge electrode to be routed to the readout circuit utilizing the gap(s) between the guard ring structure and the edge electrodes.

In other words, the wiring traces 23 from a certain edge detector element (diode/electrode) in the gap region can also be routed to the readout pad through the gaps between the edge detector elements and the guard ring structure 25.

By routing the traces as indicated in the schematic diagrams of any of FIGS. 28 to 30, the capacitance induced by each individual trace can be minimized, which would lead to lower noise in the detector.

FIG. 31A is a schematic diagram illustrating an example of a cross section of the area between guard ring structure 25 and edge electrode(s) 22 without routing traces.

FIG. 31B is a schematic diagram illustrating an example of a cross section of the area between guard ring structure 25 and edge electrode(s) 22 with routing traces 23.

Although the new detector design leads to significantly enhanced performance at the crossover region between adjacent detector sub-modules, there is still a drop in detector response at the gap. This needs to be taken into consideration, e.g. when adding a collimator structure on top (as seen in the direction of the incoming x-rays) of the detector sub-modules. Such a collimator structure normally includes a set of collimators arranged at intervals, and each detector sub-module has its own set of collimators.

Figure 32B:
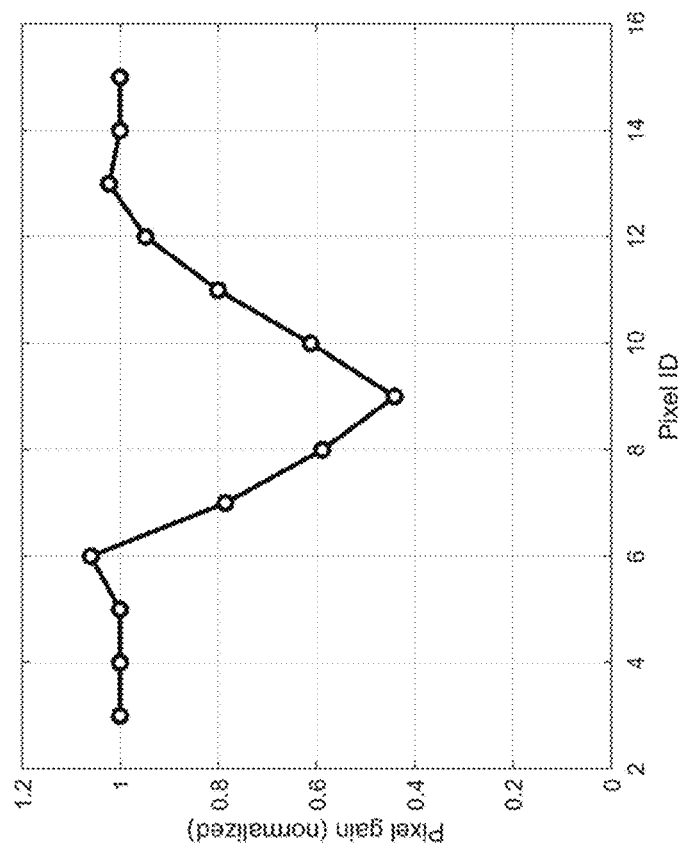
FIG. 32B is a schematic diagram illustrating an example of the pixel gain response of the pixel strips corresponding to the configuration of FIG. 32A.
Figure 32A:
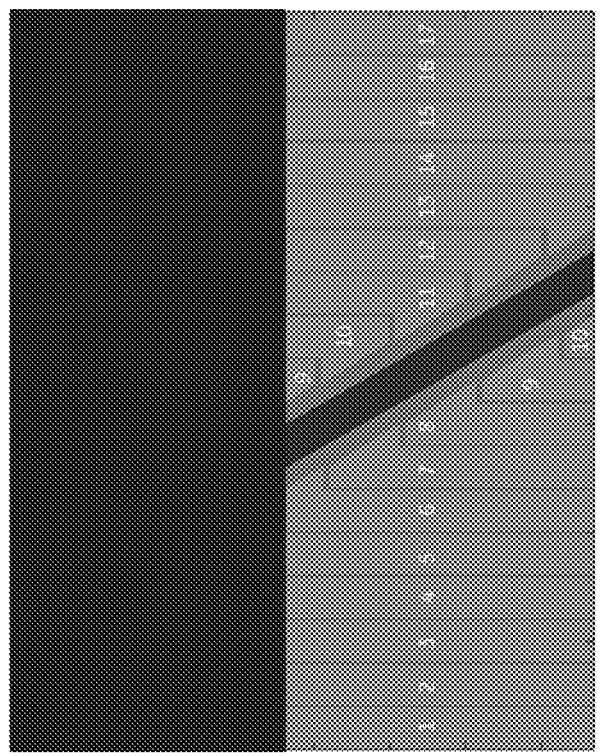
FIG. 32A is a schematic diagram illustrating an example of the crossover region between two adjacent and slanted detector sub-modules arranged side by side.

FIG. 32A is a schematic diagram illustrating an example of the crossover region between two adjacent and slanted detector sub-modules arranged side by side. The schematic diagram is an expanded view with a ratio of about 1:20. In this example, there is no collimator structure.

FIG. 32B is a schematic diagram illustrating an example of the pixel gain response of the pixel strips (i.e. detector strips) corresponding to the configuration of FIG. 32A. As can be seen there is a drop in the pixel (strip) gain when crossing the gap, but still a considerable improvement compared to a zero or near-zero response at the gap if the gap would have been aligned with and directed linearly towards the x-ray focal point.

Figure 33B:
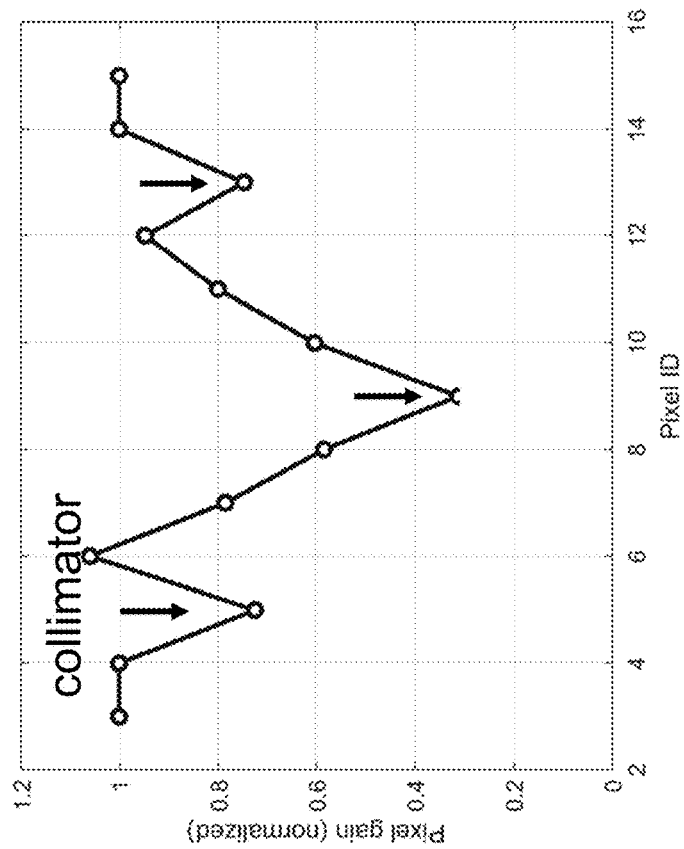
FIG. 33B is a schematic diagram illustrating an example of the pixel gain response of the pixel strips corresponding to the configuration of FIG. 33A including the collimator structure of the first configuration example.
Figure 33A:
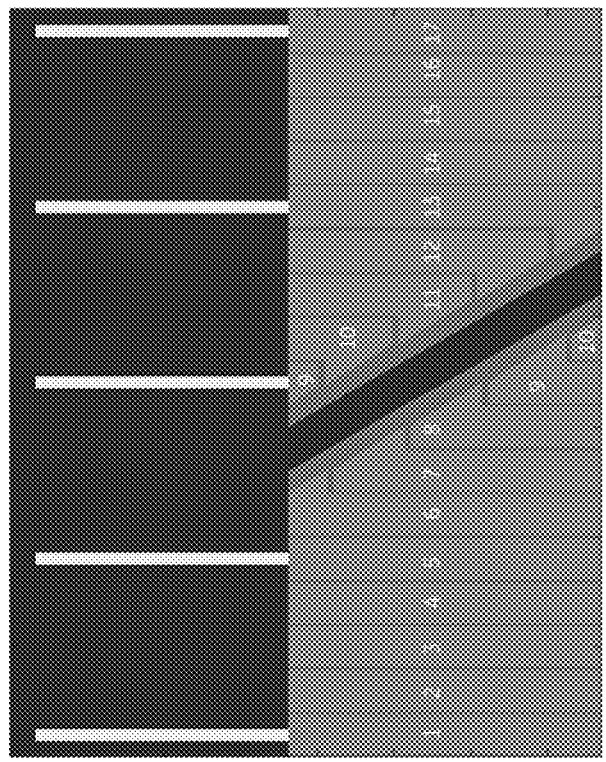
FIG. 33A is a schematic diagram illustrating an example of the crossover region between two adjacent and slanted detector sub-modules arranged side by side when a set of collimators are arranged on top of the detector sub-modules in a first configuration example.

FIG. 33A is a schematic diagram illustrating an example of the crossover region between two adjacent and slanted detector sub-modules arranged side by side when a set of collimators are arranged on top of the detector sub-modules in a first configuration example.

FIG. 33B is a schematic diagram illustrating an example of the pixel gain response of the pixel strips (i.e. detector strips) corresponding to the configuration of FIG. 33A including the collimator structure of the first configuration example. As can be seen, the introduction of the collimator structure affects the pixel strip response. The placement of the collimators according to the first configuration example makes the pixel strip response drop from a decent 0.43 gain to about 0.32 gain at the middle of the gap region, a drop of more than 25%. The pixel strip response profile is overall more spiky due to this particular collimator placement.

Figure 34B:
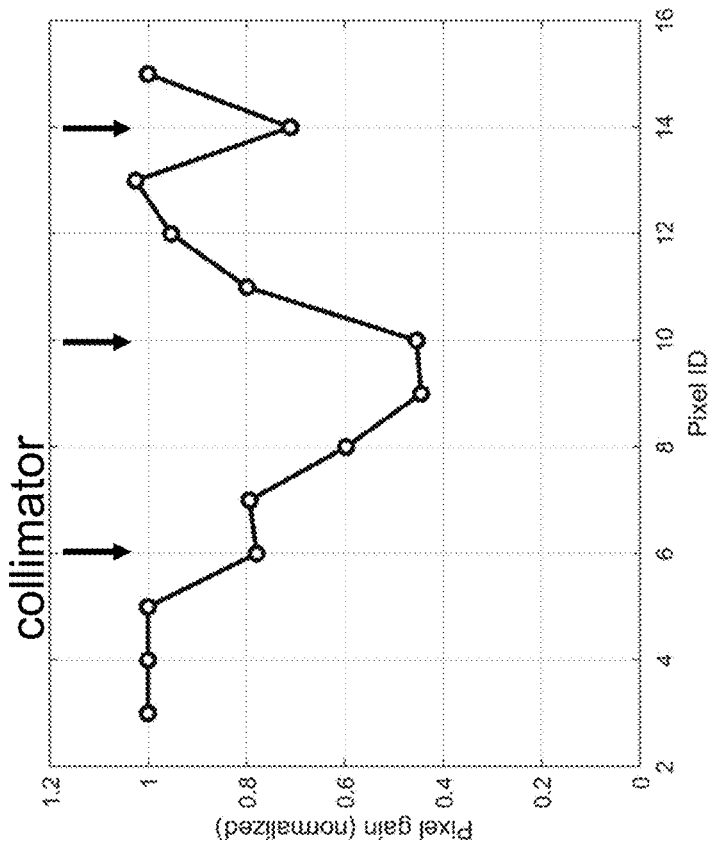
FIG. 34B is a schematic diagram illustrating an example of the pixel gain response of the pixel strips corresponding to the configuration of FIG. 34A including the collimator structure of the second configuration example.
Figure 34A:
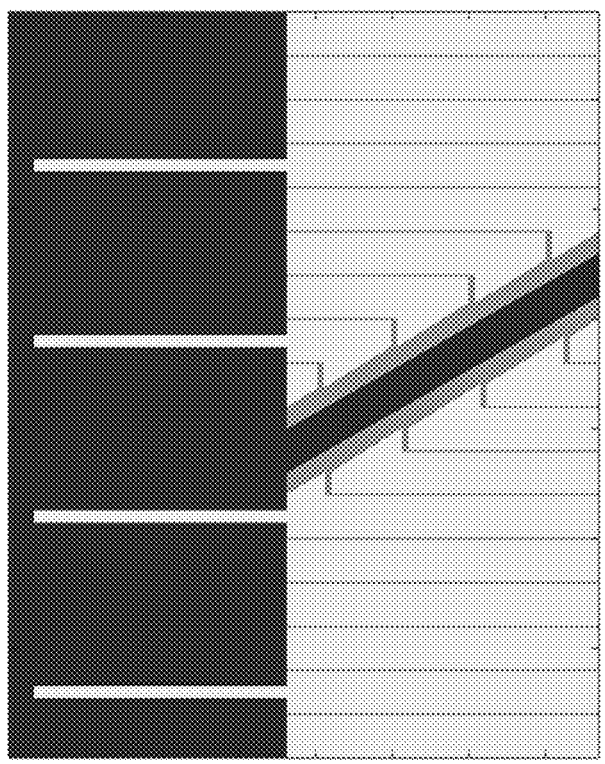
FIG. 34A is a schematic diagram illustrating an example of the crossover region between two adjacent and slanted detector sub-modules arranged side by side when a set of collimators are arranged on top of the detector sub-modules in a second configuration example.

FIG. 34A is a schematic diagram illustrating an example of the crossover region between two adjacent and slanted detector sub-modules arranged side by side when a set of collimators are arranged on top of the detector sub-modules in a second configuration example.

FIG. 34B is a schematic diagram illustrating an example of the pixel gain response of the pixel strips (i.e. detector strips) corresponding to the configuration of FIG. 34A including the collimator structure of the second configuration example. In this example, the placement of the collimators according to the second configuration example avoids lowering of the pixel strip response at the middle of the gap region, and overall makes the pixel strip response profile more uniform.

A general idea is thus to determine the placement of the collimators based on the pixel strip response (detection efficiency) profile across the gap region.

In slightly different words, each detector sub-module has a set of collimators and the placement of the collimators is at least partly determined and effectuated based on a detector strip detection efficiency profile across the gap region.

By way of example, collimators are placed with an offset from those edge detector elements (electrodes/diodes) at the cross-over region between the adjacent sub-detector modules that have the lowest detection response.

Figure 35:
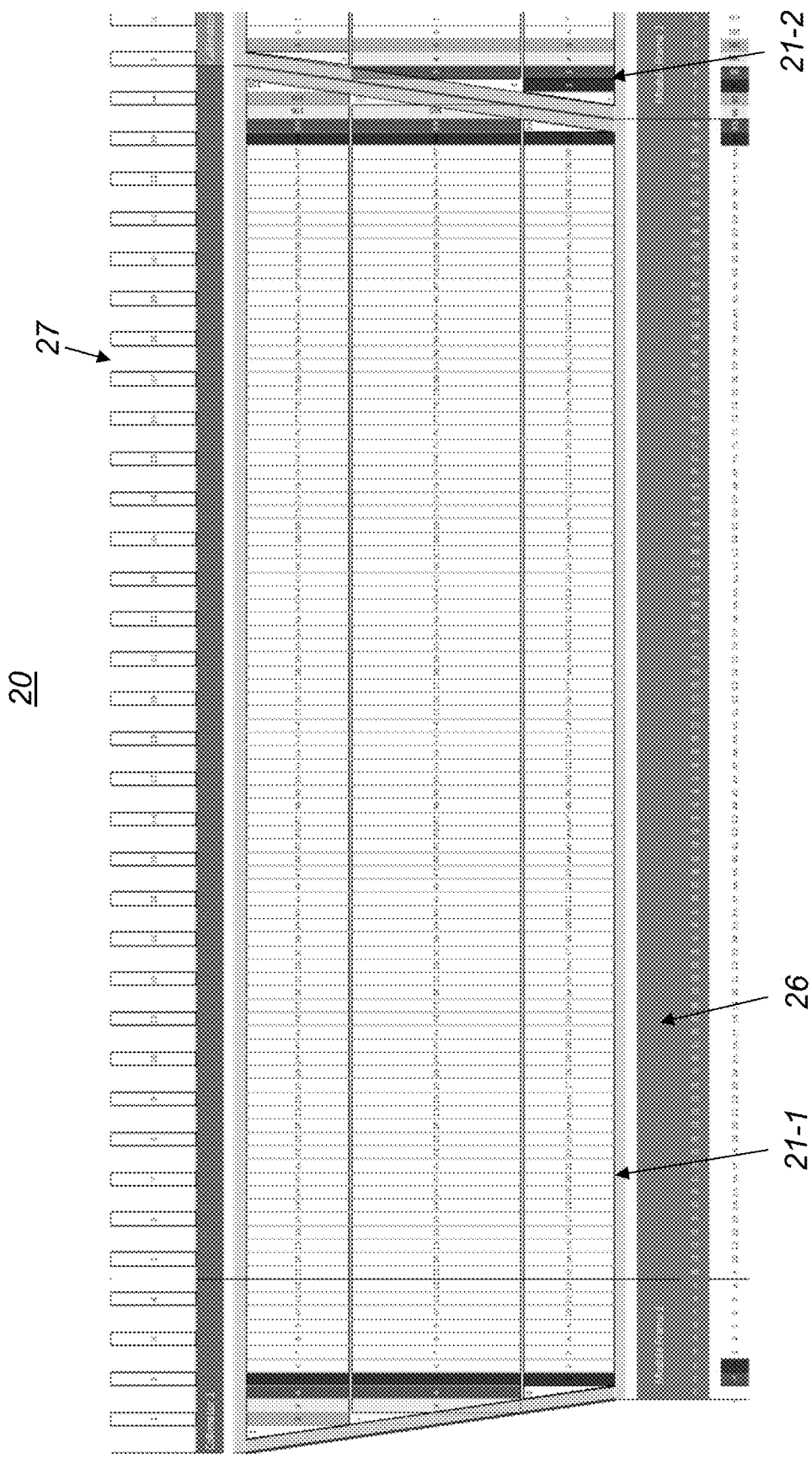
FIG. 35 is a schematic diagram illustrating an example of a depth-segmented detector sub-module arranged adjacent to another detector depth-segmented sub-module (only partly shown).
Figure 36:
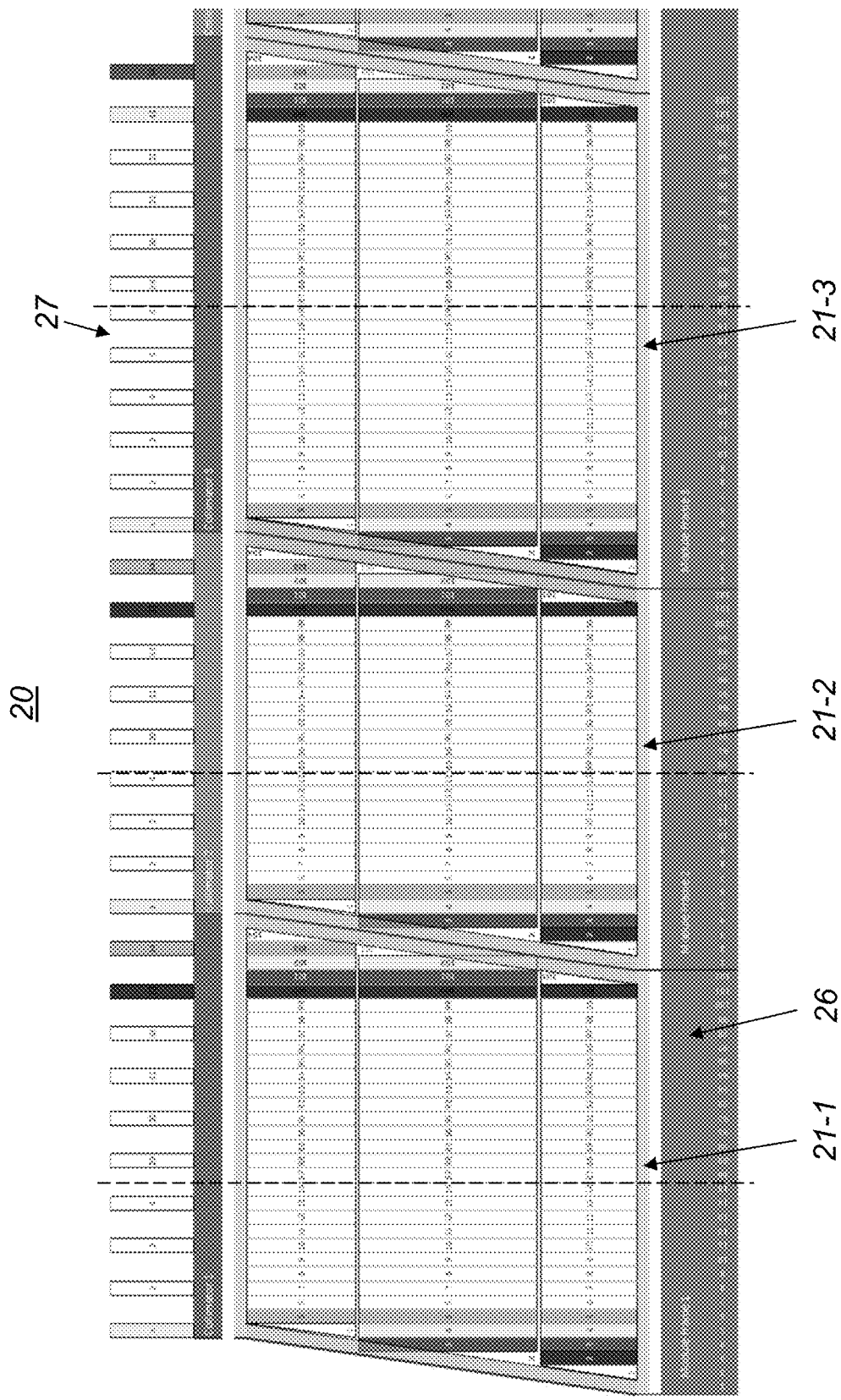
FIG. 36 is a schematic diagram illustrating another example of depth-segmented detector sub-modules arranged side by side.

For improved understanding of the geometry and implementation of the detector sub-modules, two more detailed schematics are illustrated in FIGS. 35 and 36.

FIG. 35 is a schematic diagram illustrating an example of a depth-segmented detector sub-module arranged adjacent to another detector depth-segmented sub-module (only partly shown). The overall detector 20 includes a module frame 26, detector-sub modules 21-1, 21-2 and a collimator structure 27, where each detector sub-module has a set of collimators. The slanted side-edge design is apparent from this example, as can be seen at the right-hand side of the diagram, where the detector sub-modules 21-1, 21-2 meet side by side.

FIG. 36 is a schematic diagram illustrating another example of depth-segmented detector sub-modules arranged side by side. In this particular example, the detector sub-modules 21-1, 21-2, 21-3 of the overall x-ray detector 20 have the geometric form of parallelograms.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An x-ray detector having comprising:
   a plurality of x-ray detector sub-modules, each of the detector sub-modules being an edge-on detector sub-module having an array of detector elements extending in at least two directions, one of the directions having a component in the direction of incoming x-rays, each of the edge-on detector sub-modules being a depth-segmented x-ray detector having two or more depth segments of detector elements in the direction of incoming x-rays,
   wherein the detector sub-modules are disposed side-by-side in a direction substantially perpendicular to the direction of incoming x-rays, and
   wherein, for at least part of the detector sub-modules, the detector sub-modules are configured to provide a gap between adjacent side-by-side detector sub-modules of the plurality of detector sub-modules, without at least part of the gap being directed linearly towards the x-ray focal point of an x-ray source, the adjacent side-by-side detector sub-modules having detection areas that are at least partially overlapping in the direction of incoming x-rays.

2. The x-ray detector of claim 1, wherein at least part of the gap between the adjacent side-by-side detector sub-modules is out of line with any x-ray path originating from the x-ray focal point to provide detection coverage by the adjacent side-by-side detector sub-modules at a gap extension between the adjacent side-by-side detector sub-modules.

3. The x-ray detector of claim 1, wherein the adjacent side-by-side detector sub-modules share information of one or more of the same detector elements and/or output signals of different detector elements from adjacent detector modules are combined.

4. The x-ray detector of claim 1, wherein, for at least part of the detector sub-modules, the detector sub-modules are configured to allow an x-ray that passes through two adjacent side-by-side detector sub-modules in the area of the gap to be detected by detector elements in both of the adjacent detector sub-modules.

5. The x-ray detector of claim 4, wherein output signals of detector elements of the two adjacent detector modules originating from said x-ray are combined during subsequent signal processing for photon counting.

6. The x-ray detector of claim 4, wherein at least one of the detector elements that is an edge element located closest to the gap of a first detector sub-module is situated in line with, in the direction towards the focal point, and
wherein at least another one of the detector elements that is not an edge element is not located closest to the gap of a second detector sub-module.

7. The x-ray detector of claim 1, wherein at least part of the detector sub-modules are disposed side-by-side in a slightly curved overall configuration with respect to the x-ray focal point of the x-ray source.

8. The x-ray detector of claim 1, wherein each of the detector sub-modules is based on a substrate in which the detector elements are disposed, and each detector sub-module has an outer guard ring structure that surrounds the array of detector elements along the sides of the detector sub-module.

9. The x-ray detector of claim 1, wherein the detector sub-modules are planar modules, and, for at least part of the detector sub-modules, the detector sub-modules are disposed side-by-side in an in-plane direction of the detector sub-modules.

10. The x-ray detector of claim 1, wherein, for at least part of the detector sub-modules, the detector sub-modules are disposed side-by-side in one or more of the z-direction of a Computed Tomography (CT) system and a direction perpendicular to the z-direction.

11. The x-ray detector of claim 10, wherein the detector sub-modules are disposed side-by-side in a direction substantially perpendicular to the z-direction, and the detector sub-modules are also stacked one after the other in the z-direction.

12. The x-ray detector of claim 10, wherein the detector sub-modules are disposed side-by-side substantially in the z-direction, and the detector modules are also stacked in a direction substantially perpendicular to the z-direction.

13. The x-ray detector of claim 1, wherein, for at least part of the detector sub-modules, the detector sub-modules are disposed to provide a gap between adjacent side-by-side detector sub-modules, the gap having a non-zero angle in relation to an x-ray beam path from the x-ray focal point, for at least part of the gap.

14. The x-ray detector of claim 1, wherein, for at least part of the detector sub-modules, side edges of the detector sub-modules are slanted edges or the side edges have a step-like configuration.

15. The x-ray detector system of claim 14, wherein the detector sub-modules have the geometric form of a trapezoid and/or parallelogram.

16. The x-ray detector of claim 1, wherein the detector sub-modules are edge-on silicon sensors that are shaped and patterned with electrodes such that the electrodes overlap slightly when placed side-by-side adjacent to each other.

17. The x-ray detector of claim 1, wherein the x-ray detector is a photon-counting x-ray detector.

18. The x-ray detector of claim 1, wherein detector elements at the side edge of at least one of the detector sub-modules include tapered edge segments with rounded corners, and
wherein the tip radius of the rounded corners is equal to or larger than a minimum allowed radius.

19. The x-ray detector of claim 18, wherein the tip radius of the rounded corners is equal to or larger than the charge cloud radius.

20. The x-ray detector of claim 1, wherein electrode patterns of the detector elements are modified to one or more to maintain an effective detection area and minimize an empty silicon sensor area.

21. The x-ray detector of claim 20, wherein one or more of the width of at least part of an edge detector element is larger than the width of a neighboring detector element, and the width of at least part of a neighboring detector element is larger than the largest width of a corresponding edge detector element.

22. The x-ray detector of claim 21, wherein the neighboring detector element extends into the detection line of the edge detector element.

23. The x-ray detector of claim 1, wherein at least a section of a guard ring structure of a respective sub-detector module of the sub-detector modules is modified to allow the guard ring structure to closely follow the detector elements at an edge of a sensor area of the respective sub-detector module.

24. The x-ray detector of claim 23, wherein the guard ring structure includes an implant and a plurality of guard rings, and one or more of a section of the implant and a section of at least one of the guard rings is expanded or modified to allow the guard ring structure to follow electrodes of the detector elements at the edge of the sensor area.

25. The x-ray detector of claim 1, wherein wiring traces from an edge detector element are routed to a readout pad or circuit through gaps between detector elements several steps away from the edge.

26. The x-ray detector of claim 1, wherein wiring traces from an edge detector element are routed to a readout pad or circuit through gaps between the edge detector elements and neighboring detector elements of the edge detector elements.

27. The x-ray detector of claim 1, wherein wiring traces from an edge detector element are routed to a readout pad or circuit through gaps between edge detector elements and a guard ring structure.

28. The x-ray detector of claim 1, wherein each of the detector sub-modules has a set of collimators and placement of the collimators is at least partly determined and effectuated based on a detector strip detection efficiency profile across the gap region.

29. The x-ray detector of claim 28, wherein the collimators are disposed with an offset from the edge detector elements at a cross-over region between the adjacent side-by-side sub-detector modules that have the lowest detection efficiency.

30. An x-ray imaging system comprising:
the x-ray detector of claim 1.

31. An x-ray sensor system comprising:
a plurality of x-ray detector sub-modules, each of the detector sub-modules being an edge-on detector sub-module, each of the edge-on detector sub-modules being a depth-segmented x-ray detector having two or more depth segments of detector elements in the direction of incoming x-rays, wherein the detector sub-modules are disposed side-by-side in a direction substantially perpendicular to the direction of incoming x-rays, and the detector sub modules are configured to provide a gap between adjacent ones of the detector sub-modules, at least part of the gap being out of line with any x-ray path originating from the x-ray focal point of an x-ray source to provide detection coverage by the adjacent side-by-side detector sub-modules at a crossover region between the adjacent side-by-side detector sub-modules, the adjacent side-by-side detector sub-modules having detection areas, including one or more detector elements, that are at least partially overlapping in the direction of incoming x-rays.

32. The x-ray sensor system of claim 31, wherein the x-ray detector sub-modules are edge-on silicon sensors that are shaped and patterned with electrodes configured to allow the x-ray detector sub-modules to overlap slightly when disposed side-by-side adjacent to each other.

\* \* \* \* \*